US011123908B2

(12) United States Patent
Wieder

(10) Patent No.: US 11,123,908 B2
(45) Date of Patent: *Sep. 21, 2021

(54) CORE LIFTER FOR MOLDING APPARATUS

(71) Applicant: Accura-Tec, Inc., Helenville, WI (US)

(72) Inventor: Klaus A. Wieder, Helenville, WI (US)

(73) Assignee: Accura-Tec Inc., Helenville, WI (US)

(*) Notice: Subject to any disclaimer, the term of this patent is extended or adjusted under 35 U.S.C. 154(b) by 332 days.

This patent is subject to a terminal disclaimer.

(21) Appl. No.: 15/590,000

(22) Filed: May 8, 2017

(65) Prior Publication Data
US 2017/0320249 A1 Nov. 9, 2017

Related U.S. Application Data

(60) Provisional application No. 62/332,594, filed on May 6, 2016.

(51) Int. Cl.
B29C 45/44 (2006.01)
B29C 45/26 (2006.01)
B29C 45/43 (2006.01)

(52) U.S. Cl.
CPC .......... B29C 45/4435 (2013.01); B29C 45/26 (2013.01); B29C 45/263 (2013.01); B29C 45/43 (2013.01)

(58) Field of Classification Search
CPC ................ B29C 45/4435; B29C 45/26
See application file for complete search history.

(56) References Cited

U.S. PATENT DOCUMENTS 5,219,594 A * 6/1993 Meyer ................. B29C 45/4435
249/180
5,316,467 A * 5/1994 Starkey ................. B29C 33/442
249/66.1

(Continued)

FOREIGN PATENT DOCUMENTS

ES 2238881 9/2005
ES 2238881 A1 * 9/2005

(Continued)

OTHER PUBLICATIONS

Machine Translation—KR20120000715, Core Unit of a Mold, Park (Year: 2010).*

(Continued)

Primary Examiner — Matthew J Daniels
Assistant Examiner — Wayne K. Swier
(74) Attorney, Agent, or Firm — Boyle Fredrickson S.C.

(57) ABSTRACT

A core lifter having lifter bar with an elongate blade which carries a coupling head received in an elongate lifter bar coupling receiver formed in the base configured to permit pivotable, swiveling and/or translational misalignment or tolerance compensation during core lifter assembly, installation, and operation in a plastic formable material molding apparatus, including during mold cycling advantageously preventing core lifter binding and extending core lifter life. A preferred lifter has a lifter bar formed of a blade to which a lifter bar coupling ball is attached that is received in an elongate longitudinally extending channel having a transverse cross section complementary to the ball defining a bearing race in which the ball is received enabling slidable pivoting, swiveling and slidable movement of the ball and blade relative thereto including while the ball and blade are slidably moving along the race in a longitudinal or lengthwise direction relative to the base.

25 Claims, 13 Drawing Sheets

(56) References Cited

U.S. PATENT DOCUMENTS

| | | | | |
|---|---|---|---|---|
| 5,551,864 | A | * | 9/1996 | Boskovic ............ B29C 45/4435 425/556 |
| 5,773,048 | A | * | 6/1998 | Ramsey .............. B29C 45/4435 425/556 |
| 5,814,357 | A | | 9/1998 | Boskovic |
| 6,491,513 | B1 | * | 12/2002 | Schneider ........... B29C 45/4435 425/438 |
| 6,655,952 | B1 | * | 12/2003 | Kraft ................... B29C 45/4435 264/318 |

FOREIGN PATENT DOCUMENTS

| | | | | |
|---|---|---|---|---|
| JP | 2001079898 | | 3/2001 | |
| JP | 2001079898 A | * | 3/2001 | ......... B29C 45/4435 |
| JP | 2007283746 | | 11/2007 | |
| JP | 3235618 | | 10/2017 | |
| KR | 2007 0091463 | | 9/2007 | |
| KR | 20120000715 | | 1/2012 | |
| KR | 20120000715 A | * | 1/2012 | ......... B29C 45/4435 |

OTHER PUBLICATIONS

Machine Translation JP2001079898A (Year: 2001).*
Machine Translation ES2238881A1 (Year: 2002).*
Machine Translation KR20120000715A (Year: 2012).*

\* cited by examiner

CORE LIFTER FOR MOLDING APPARATUS

CROSS-REFERENCE

This application claims priority under 35 U.S.C. § 119(e) in U.S. Provisional Patent Application No. 62/332,594, filed May 6, 2016, the entirety of which is hereby expressly incorporated herein by reference.

FIELD

The present invention is directed to a core lifter for a molding apparatus and more particularly to a core lifter better able to pivot and rotate about multiple axes during ejection of a molded part made with an undercut.

BACKGROUND

In a plastic molding apparatus, a core is an additional component of a mold of a plastic molding apparatus that is used to form a feature in a plastic molded part that cannot be otherwise formed by the mold or molds of the plastic molding apparatus used to make the plastic part. In making such a feature-containing plastic part, the core is disposed within the mold cavity to form the feature during molding of the part but then moved out of the way when molding is completed to enable the plastic part to be removed.

When forming certain types of features, particularly undercuts, into a plastic molded part, a core lifter is used to position the core within the mold cavity where the core will form the desired feature, e.g., undercut, during molding of the rest of the part. After molding of the part is finished, the core lifter moves the core out of the way so the core will not interfere with part removal by the lifter causing the core to clear the feature formed by the core in the molded part. While such a core lifter can be configured so the core is a separate component that is then mounted or otherwise attached, most core lifters are configured with the core formed as an integral part of the core lifter.

Core lifters are commonly used in plastic molding apparatuses that preferably are plastic injection molding apparatuses to help form an internal undercut in a plastic part being molded. Core lifters do so by helping to enable a movable core of a mold of the plastic injection molding apparatus used to form the internal undercut to be moved out of the way after the undercut-containing plastic part has been formed. Core lifters also help enable the plastic part to be ejected from the plastic injection molding apparatus in readying the plastic injection molding apparatus to form another substantially identical undercut-containing plastic part. Such core lifters for plastic injection molding apparatuses are connected to the core and typically actuated by the ejection system of the plastic injection molding apparatus to move the core into position during closing of the molds of the plastic injection molding apparatus and to move the core out of position during ejection of the plastic part formed with the undercut produced by the core.

In the past, custom core lifters were commonly used in plastic injection molding apparatuses that were made of a core blade or lifter bar seated at a predetermined angle by mounting one end of the blade or bar at a fixed angle to a coupling which slidably moved linearly along a support mounted to ejection plates of the ejector system. In order to custom design custom core lifters, a mold designer needed to take into account the amount of undercut needed, the horizontal displacement required, as well as the distance the ejector system that the particular plastic injection molding apparatus must travel during plastic part molding in determining the necessary angle for the lifter. Quite often such custom design core lifters were one time or one off designs that were not only expensive to make but which could not be used in other molds, even molds relatively similar to the one for which they were custom designed.

U.S. Pat. No. 5,316,467 is directed to a core lifter that is intended to be of universal construction having a core blade, e.g., lifter bar, which is pivotally mounted to a coupling fixed to a separate support that attaches to the ejector system. The end of the lifter bar has a heel with a pair of flat sides and a bottom with a partially spherical convex surface that is received in a curved dovetail of the coupling equipped with a cooperating partially spherical convex surface. While the core lifter disclosed in the '466 is an improvement over a prior unsuccessful attempt at making such a universal core lifter disclosed in parent, U.S. Pat. No. 5,132,442, it still suffers from considerable drawbacks.

While the '467 core lifter does allow an angle of the core blade or lifter bar to be varied relative to an axis transverse to the coupling dovetail that also extends transversely through the flat sides of the heel of the bar, the range of angular adjustment typically is too limited to prevent the bar from binding and/or the core lifter from otherwise failing during mold operation. While the '467 core lifter does permit some angular adjustment relative to the transverse axis, it typically offers less, if any, angular adjustment relative to an axis longitudinal to the coupling dovetail that also extends longitudinally through the lifter bar heel, which often is too limited to prevent binding and core lifter failure during mold operation.

Just as bad, if not worse, is the fact that the gaps between each flat side of the heel and adjacent flat dovetail sidewall can provide too much play thereby allowing the lifter bar to move too much in a side-to-side direction during molding, which can cause the core to be improperly positioned in the mold during molding. This can not only cause defective parts to be molded, but also can lead to binding and core lifter failure if the excessive play allows the lifter bar to displace too far to one side or the other. Frequently exacerbating these problems is the fact that the heel cannot move strictly in a side-to-side direction in the dovetail because the cooperating spherical surfaces cause the lifter bar to pivot about the longitudinal axis. Since the lifter bar heel cannot move side-to-side within the dovetail of the coupling without also pivoting, core misalignment and binding can and do occur with the '467 core lifter.

While the core lifters disclosed in U.S. Pat. No. 5,316,467 have enjoyed substantial commercial success, improvements nonetheless remain desirable. For example, there are times that present day core lifters end up becoming misaligned during mold closing or during part ejection. Depending on how bad the misalignment is or becomes over time, binding can even occur which requires costly stoppage to fix and which can still result in the very mold damage they were intended to prevent.

As a result of at least these deficiencies in the '467 core lifter and other commercially available core lifters suffering from similar drawbacks, it is further believed that none of these prior art core lifters are fully articulating in any direction and therefore lack any ability to self-align. As a result of such an inability of prior art core lifters to self-align during assembly, installation, and use during molding, core misalignment and mislocation, core lifter binding, and core lifter failure occur far more commonly than believed.

SUMMARY

The present invention is directed to a core lifter for a plastic molding apparatus that preferably is a plastic injection molding apparatus having at least one mold in which a feature is molded into a plastic part using such a core lifter that moves out of the way during ejection of the molded plastic part. A core lifter of the present invention advantageously provides angular and tolerance compensation that not only prevents binding during molding but which also decreases wear during operation.

The core lifter includes a core blade or lifter bar and a core lifter base. The lifter bar has a first end configured to cause a feature to be formed in material being formed by the core lifter and a second end. For instance, the first end can be a three dimensionally contoured feature-molding end configured to mold plastic. The lifter bar is movably attached to the core lifter base. For instance, the core lifter base can contain an elongate guide shoe within which the second end of the lifter bar is received. The core lifter base is grounded to the material forming apparatus. For instance, the core lifter base can be removably anchored to an ejector plate of the mold.

The lifter bar can pivot, swivel, and rotate about the core lifter base. For instance, the bar can pivot about a pivot axis that extends transversely to a longitudinal centerline of the core lifter base at least ±20 degrees about the pivot axis. Additionally, the lifter bar can swivel about a swivel axis extending downwardly through the center of the lifter bar. The bar can swivel at least 20 degrees about the swivel axis, and up to 360 degrees about the swivel axis. The bar can also tilt about a tilt axis where the tilt axis extends along a longitudinal centerline of the core lifter base. For instance, the lifter bar can tilt at least ±10 degrees about the tilt axis.

Additionally, the core lifter can further include a guide ball that is releasably coupled to the second end of lifter bar. The core lifter bar preferably is formed of an elongate blade that can have a removable core attached to one end and the guide ball attached to the opposite end. The guide ball can have a convexly rounded outer surface. The guide ball can be a ball bearing with a recessed lifter bar end-receiving seat formed between a pair of spaced apart and generally parallel arms disposed on opposite sides of a portion of the lifter bar received therebetween when mounting the ball to the lifter bar. In a preferred embodiment, the ball is a generally U-shaped ball bearing between which is disposed the recessed lifter bar end receiving seat. Where the guide ball includes the pair of generally parallel hinge knuckle arms, the second end of the lifter bar can be received between the pair of generally parallel hinge knuckle arms. A pin can then be inserted into a bore formed in the second end of the bar, as well as a first bore formed in a first hinge knuckle arm and a second bore formed in a second hinge knuckle arm.

The core lifter base can have a generally U-shaped bearing race with a concavely curved bottom and a pair of opposed concavely curved sides. Thus, the bearing race can be complementary in shape or contour with that of the guide ball. Similarly, the guide ball can comprise a generally spherical side outer surface and generally spherical bottom. The bearing race can also have a generally spherical bottom and a pair of opposed generally spherical sidewalls.

A lateral gap can be located between the second end of the lifter bar and the guide ball. The lateral gap can allow for side-to-side movement of the second end relative to the guide ball. This side-to-side movement can be independent of movement along the pivot axis, the tilt axis, or the swivel axis.

The second end of the lifter bar can include a ball-and-socket coupler and the elongate guide shoe can include a ball- and socket received such that the bar and the core lifter base form a ball and socket connection. Once the ball and socket connection is formed, the second end of the bar can be pivotable, slidable, rotatable, and translatable about the elongate guide shoe. Similarly, the second end can be angularly adjustable within the elongate guide shoe. Also, the second end can be pivotally adjustable within the elongate guide shoe. Additionally, the second end can be axially adjustable fore and aft within the elongate guide shoe. Further still, the second end can be transversely adjustable within the elongate guide shoe.

A coupler ball can be releasably attached to the second end of the lifter bar, such that the bar is received within the elongate guide shoe. Thus, the coupler bay can slidably ride along the elongate guide shoe. The second end of the lifter bar can have a generally I-shaped coupling head that is received within a generally I-shaped channel that extends generally transversely through the coupler ball. The I-shaped coupling head can have an endwall and the I-shaped channel can have an endwall, such that the coupling head endwall is located adjacent to the channel endwall when the coupling head is received by the channel. The coupling head endwall and the channel endwall can be separated by a gap, which allows relative rotational movement of the coupler ball about the coupling head. For instance, the gap can allow relative rotational movement of not more than approximately 5 degrees by the coupler ball about the coupling head. The gap can also allow relative rotational movement of not more than approximately 2.5 degrees by the coupler ball about the coupling head. The gap can only allow relative movement of not more than approximately 1 degree by the coupler ball about the coupling head. Additionally, a gap can separate a sidewall of the generally I-shaped coupling head from a sidewall of the generally I-shaped channel, which would allow for relative side-to-side movement between the coupler ball and the coupling head.

The coupler ball can slide over the coupling head, and a retainer can extend through a plurality of bores formed in the coupler ball and a bore formed in the second end of the lifter bar. The retainer can function as a pivot such that the coupler ball is rotatable relative to the coupling head. The coupler ball can also be movable about three axes relative to the core lifter base.

The elongate guide shoe can additionally have a pair of oppositely inwardly extending core lifter bar inwardly extending lifter bar guide arms forms a guide slot about the elongate recessed channel. The coupler ball is slidable along the elongate recessed channel, and the pair of oppositely inwardly extending lifter bar guide arms prevents the coupler ball from being pulled out of the guide slot. Additionally, the pair of oppositely inwardly extending lifter bar guide arms limit angular rotation of the coupler ball about a generally transversally axis that extends through a centerline of the coupler ball. More specifically, the pair of oppositely inwardly extending lifter bar guide arms can limit angular rotation of the coupler ball to no more than approximately 15 degrees. Alternatively, the pair of oppositely inwardly extending lifter bar guide arms can limit angular rotation of the coupler ball to no more than approximately 10 degrees. Additionally, the pair of oppositely inwardly extending lifter bar guide arms can limit angular rotation of the coupler ball to no more than approximately 5 degrees.

These and other objects, features and advantages of this invention will become apparent from the following detailed description of the invention and accompanying drawings.

DRAWINGS

Preferred exemplary embodiments of the invention are illustrated in the accompanying drawings in which like reference numerals represent like parts throughout and in which.

Figure 9:
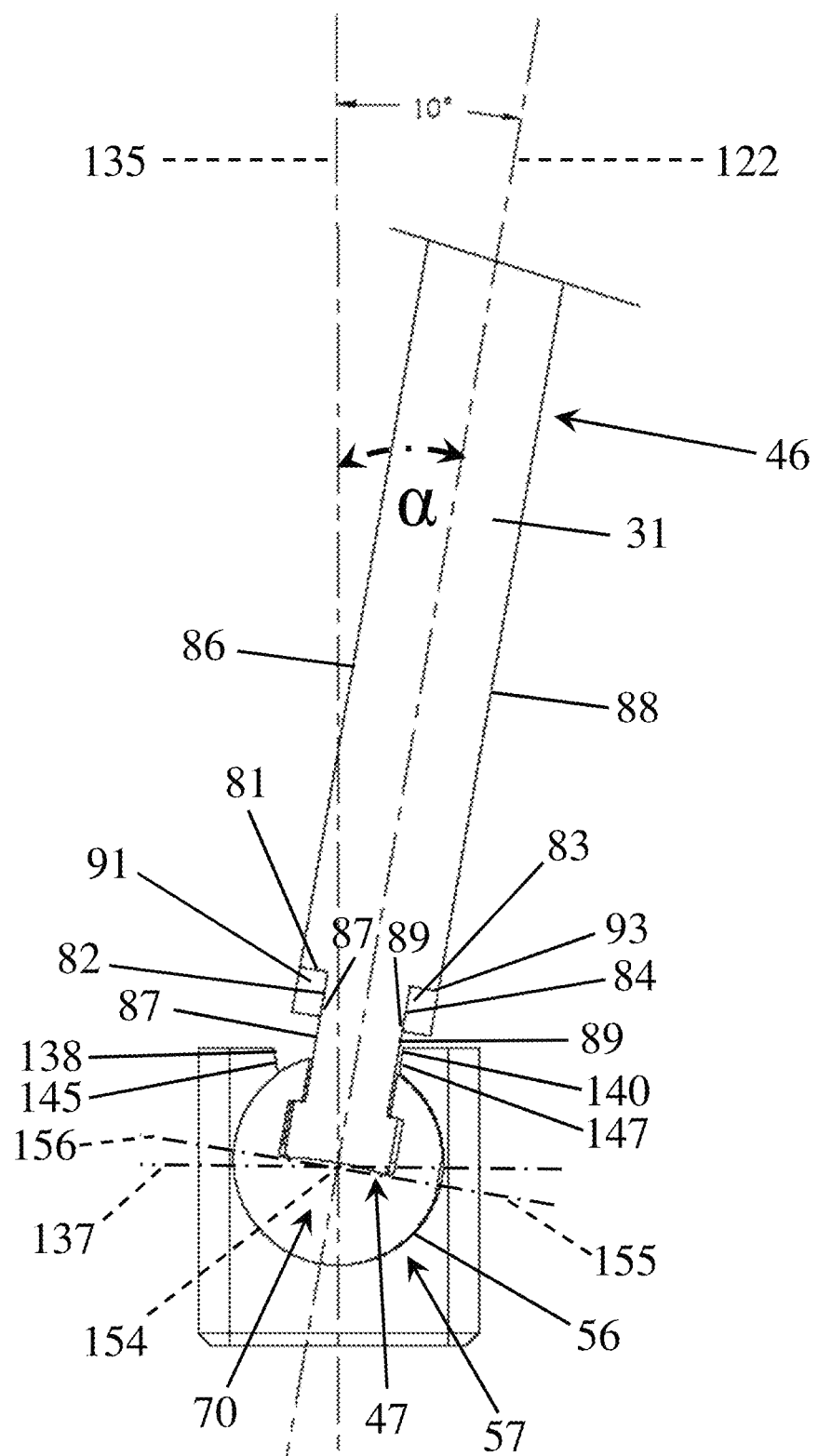
FIG. 9 is a front elevation view of a core lifter assembly of the present invention depicting side-to-side angular adjustment or self-alignment of an angular range of up to ±10 degrees about a first axis extending along a longitudinal centerline of the bearing raceway that also extends through a center of the ball of the coupler assembly.
Figure 11:
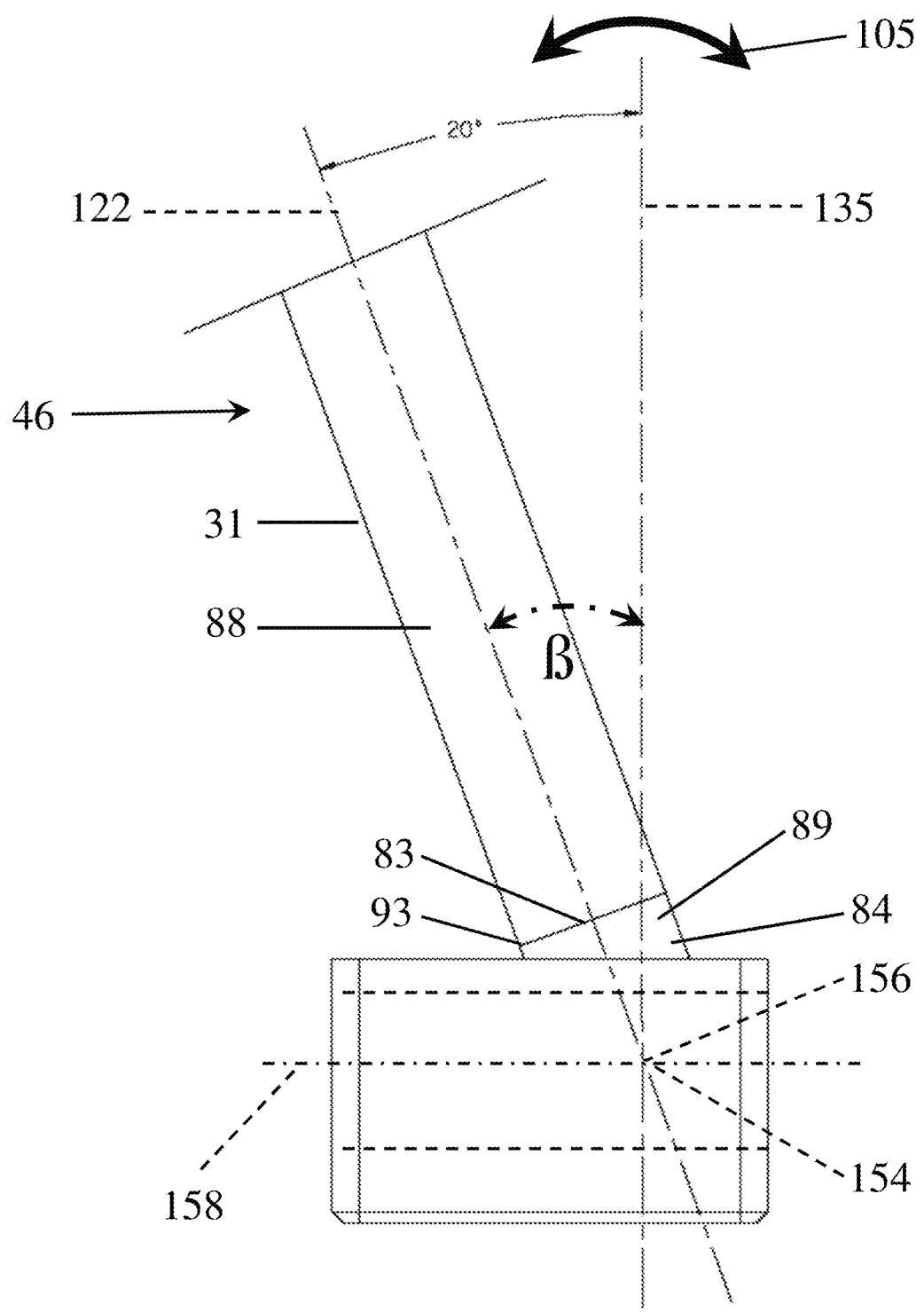
Figure 12:
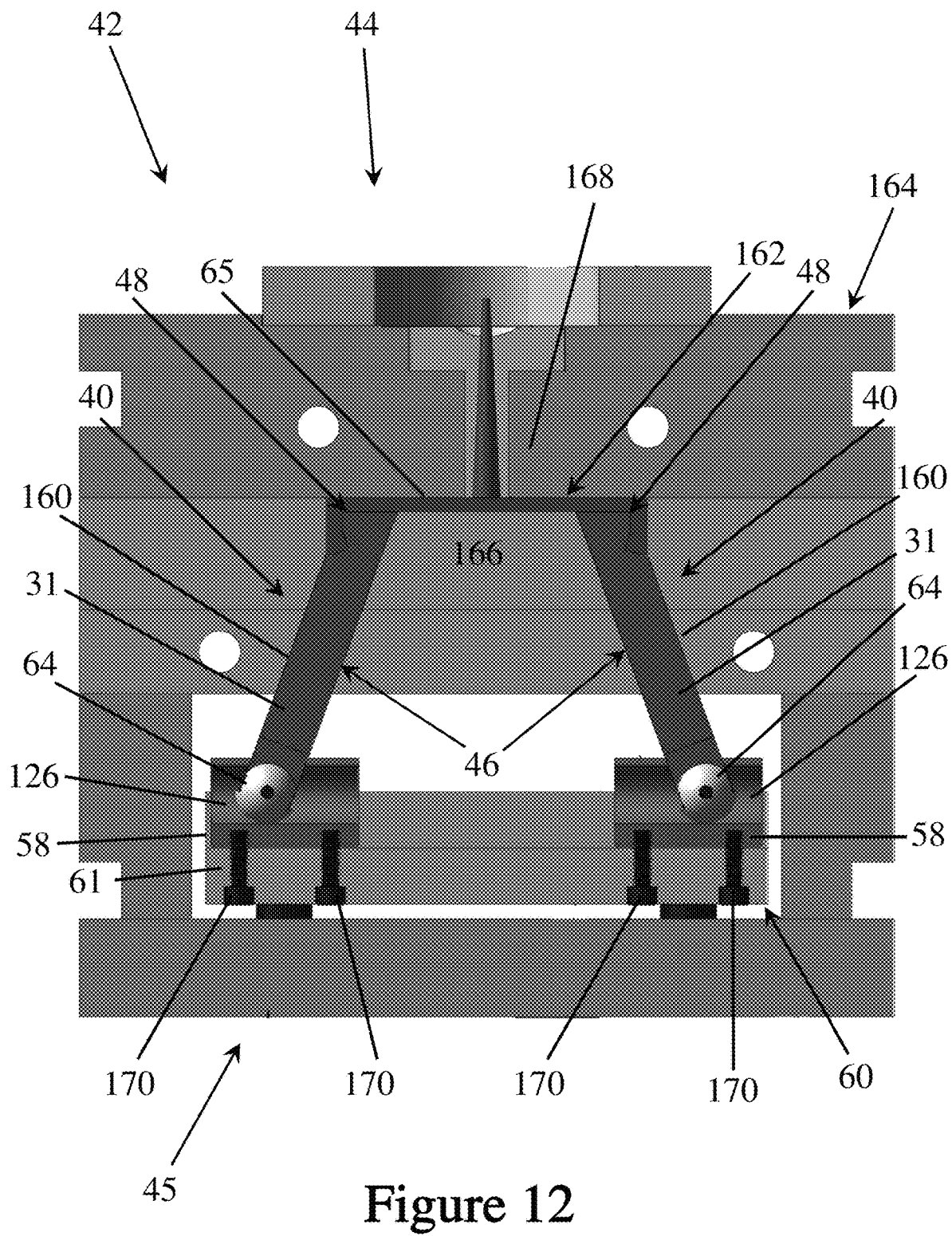
Figure 13:
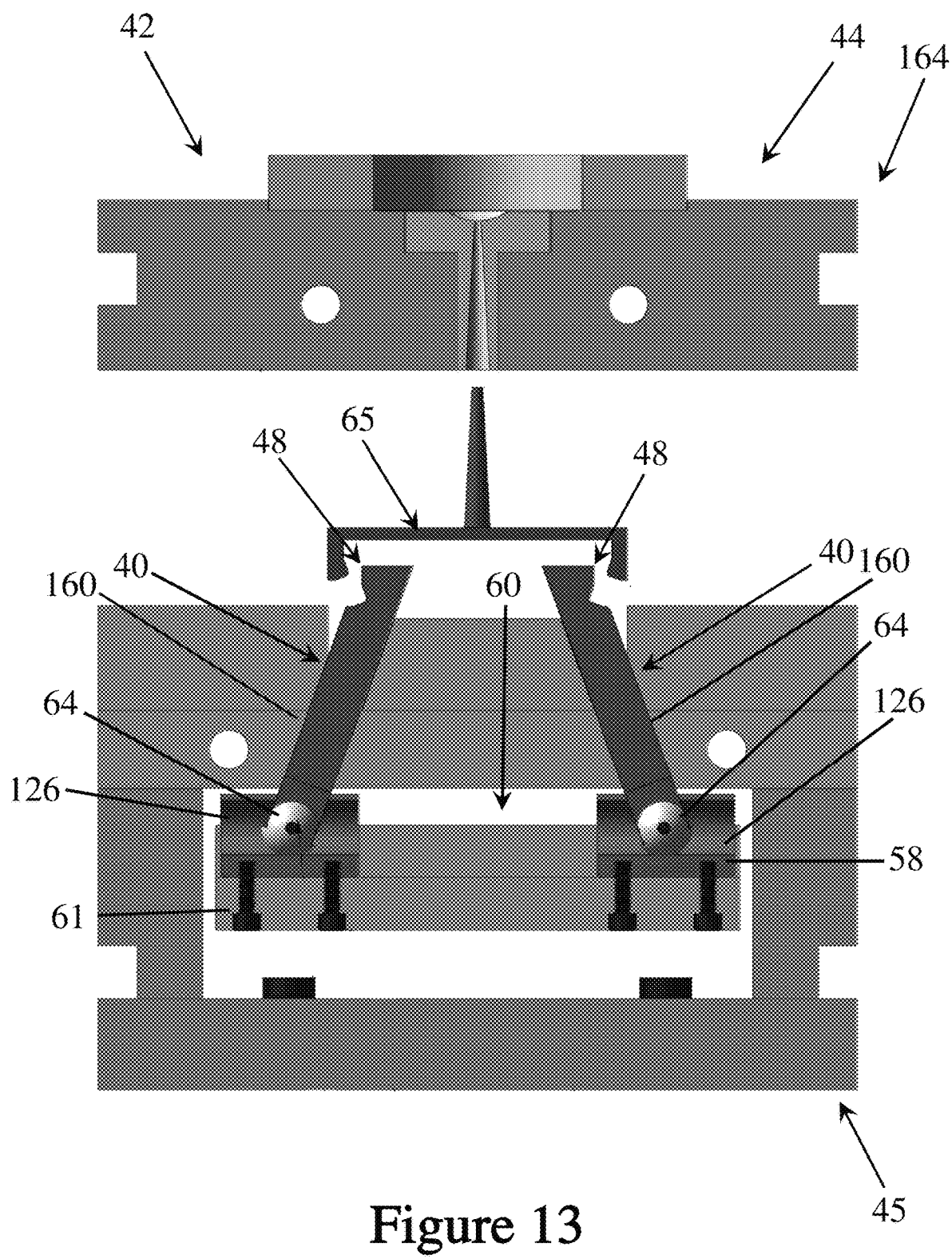

FIG. 11 is a front elevation view of the core lifter assembly of FIG. 9 depicting fore-aft angular adjustment or self-alignment of an angular range of up to ±20 degrees about a second axis extending transversely to the longitudinal centerline of the bearing raceway that also extends through a center of the ball of the coupler assembly where the second axis is translatable along the bearing raceway;

FIG. 12 illustrates use and operation of a plurality of core lifter assemblies of the present invention installed in a molding apparatus with the mold closed forming a plastic part where a molding end of each core lifter apparatus forms an internal undercut in the plastic part being molded; and FIG. 13 illustrates use and operation of the plurality of core lifter assemblies during ejection of the formed plastic part where the core blade or lifter bar of each core lifter assembly is able to adjust or align by being able to translate in a side-to-side direction, in a fore-aft direction longitudinally along the raceway, in a side-to-side direction generally transversely relative to the raceway, rotatively in a fore-aft direction, and/or rotatively in a side-to-side direction during mold closing and mold opening.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-13 illustrate a preferred embodiment of a core lifter 40 of the present invention for use in a molding apparatus 42, which preferably is a formable material molding apparatus 44, and which more preferably a plastic molding apparatus 45, such as the plastic injection molding apparatus 45 depicted in FIGS. 12 and 13, which advantageously is configured to angularly adjust, including to provide angular alignment compensation, during molding apparatus operation that preferably also is a core lifter 40 of self-aligning construction in that the core lifter 40 also is pivotable along a plurality of axes while also being able to provide side-to-side tolerance compensation during molding apparatus operation. Such a core lifter 40 constructed in accordance with the present invention is able to more smoothly operate in a wider range of molding apparatuses and under a greater range of operating conditions while lasting longer thereby advantageously facilitating smoother molding apparatus operation leading to increased molding apparatus uptime.

With reference to FIGS. 1-11, the core lifter 40 has a core blade or lifter bar 46 with an elongate substantially straight lifter bar blade 31 equipped with a actuator end 55 at one end that is or includes a three dimensionally contoured feature-molding core 48 carried by the blade 31. The lifter bar 46 has a pivotable, slidable, rotatable, and translatable coupling arrangement 50 disposed at an opposite end of the blade 31 that is a coupling end 52 of the bar 46 or blade 31 preferably configured to provide at least a plurality of, preferably at least a plurality of pairs of, i.e., at least three, (a) angular adjustment, (b) pivotable adjustment, (c) fore-and-aft axial translatable adjustment, and/or (d) transverse side-to-side adjustment producing a core lifter 40 in accordance with the present that is at least partially self-aligning and/or tolerance compensating, and which preferably is substantially completely self-aligning and/or tolerance compensating. As is discussed in more detail below, the coupling arrangement 50 preferably includes a core lifter bar coupling head 57 carried by the blade 31 at or adjacent the coupling end 52 with the core lifter bar coupling head 57 having a shape or contour complementary to a core lifter bar coupling receiver 56 of a core lifter base 58 in which the coupling head 57 is movably, preferably slidably, received.

The lifter bar coupling receiver 56 preferably is elongate recessed into the base 58 with the receiver 56 extending longitudinally or in a lengthwise direction relative to the base 58. The base 48 preferably is formed of an elongate body 61 that is generally rectangular both in a lengthwise direction and transverse direction of the base 48. The lifter bar coupling receiver 56 can and preferably does extend longitudinally substantially the length of the body 61 of the base 58.

In a preferred embodiment, the lifter bar coupling receiver 56 has a cross-section or cross-sectional contour or shape that is substantially complementary to a shape or contour, preferably a peripheral shape or peripheral contour, of the coupling head 57 enabling the head 57 to be movably received in the receiver 56 thereby movably coupling the lifter bar 46 and core 48 to the base 58. With the base 58 preferably fixed to part of the molding apparatus 42, preferably an ejector plate or ejector plate assembly of the apparatus 42, receipt of the head 57 in the receiver 56 movably couples the lifter bar 46 and core 48 to the base 58 in a manner permitting the head 57 to translate along the receiver 56 enabling the bar 46 to substantially simultaneously move in a generally linear direction relative to the base 58 during mold cycling during molding apparatus operation.

Figure 3:
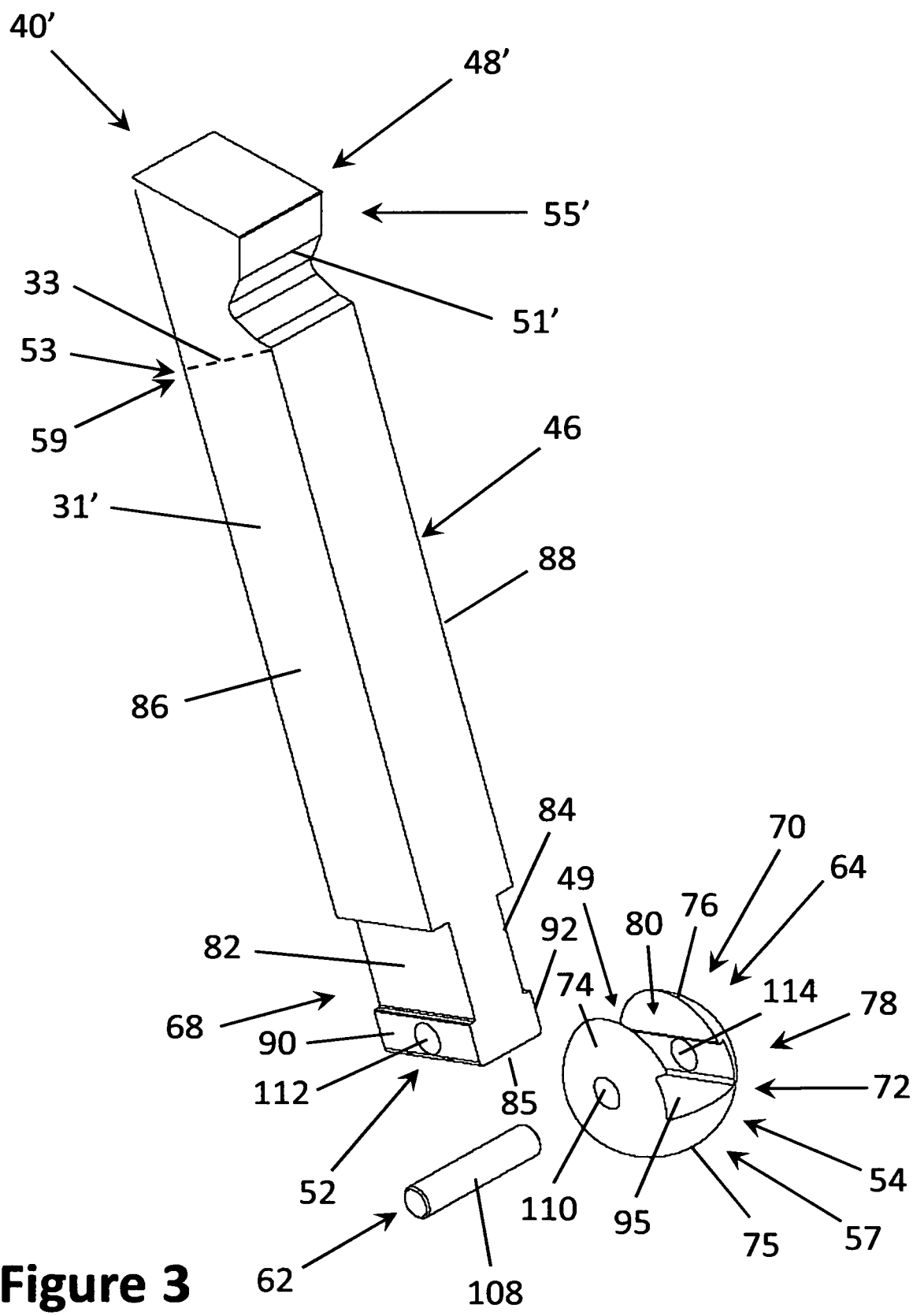
FIG. 3 is a perspective exploded view of the core blade or lifter bar coupler assembly.

While the three-dimensionally contoured molding end 55 of the lifter bar 46 preferably is integrally shaped or formed to provide a core 48 with a core molding face 51, which can be and preferably is a three-dimensionally contoured molding face 51, which forms or molds a correspondingly three-dimensionally shaped feature in the part being molded (not shown), it is contemplated that a core lifter 40' of the present invention can further be configured to have a replaceable three-dimensionally contoured molding end 55' with a removable or replaceable core 48', such as depicted in FIG. 3, which is a component separate from the blade 31' of the lifter bar 46' that is attached or mounted to a core-mounting end 53 of such a removable core carrying lifter bar blade 31' during assembly of a lifter bar 46' in making of such a removable core carrying core lifter 40'. FIG. 3 shows a dashed or phantom line 33 delineating where the separate core 48' engages with the core-mounting end 53 of the blade 31' of the core lifter bar 46' of such a core lifter 40' of the present invention that is constructed and arranged and/or configured to removably accept one of at least a plurality of different cores 48' having a plurality of different three-dimensionally contoured molding faces 51', lengths, widths, depths, sizes or shapes.

With continued reference to FIG. 3, separate core 48' is of removable construction, which can be and preferably is of replaceable construction, and which can be and preferably is three-dimensionally contoured to removably or releasably engage with a core-mounting end 53 of the blade 31' of the lifter bar 46' to removably attach the core 48' to the blade 31' of the bar 46' with the core-mounting end 53 preferably being complementarily three-dimensionally contoured such that a releasable core attachment joint 59 is formed at dashed or phantom line 33 in FIG. 3 between the core 48' and the end of the blade 31' of the lifter bar 46' when the core 48' is attached thereto. In a preferred embodiment, the core 48' and core-mounting end 53 of the blade 31' are complementarily three-dimensionally contoured to produce a core attachment joint 59 of snap-fit construction that enables the core 48' to be snapped onto the core-mounting end 53 of the lifter bar blade 31' during assembly of lifter bar 46' and to be snapped off from the core-mounting end 53 of the blade 31' during removal of the core 48' from blade 31' of the bar 36' of the core lifter 40'.

A core 48' and core lifter 40' with a lifter bar 46' having a lifter bar blade 31' with a core-mounting end 53 configured to enable attachment and detachment of core 48' thereby advantageously enables a plurality of different cores 48' having a molding face 51 with plurality of different three-dimensional shapes, three-dimensional contours, and/or sizes to be interchangeably used with the same or single core lifter 40' of the invention. In a preferred embodiment, such a core 48' and core lifter 40' of the present invention with a lifter bar 46' having a blade 31' with such a core-mounting end 53 configured to form, provide or produce a core-attachment joint 59 that enables removable or releasable mounting of the core 48' to the core-mounting end 53 of the blade 31' of the lifter bar 46' advantageously enables cores 48' having a plurality of differently shaped or three-dimensionally contoured molding faces 48' to be interchangeably mounted, e.g., attached to and detached from the core-mounting end 53 of the blade 31' of the lifter bar 46', to the same single core lifter 40'.

With continued reference to FIG. 3, separate core 48' is of removable construction, which can be and preferably is of replaceable construction, and which can be and preferably is of toollessly attachable and/or of toollessly removable construction, with a preferred embodiment of such a core 48' of the invention being a component separate from lifter bar blade 31' and lifter bar 46' of core lifter 40' with the lifter bar blade 31' of the lifter bar 46' having a core-mounting end 53 configured to form a core attachment joint 59 that enables the core 48' to be toollessly attached to the core-mounting end 53 of the blade 31' of bar 46' and/or toollessly detached from the mounting end of the blade 31' of bar 46'. In one such preferred embodiment, in accordance with that discussed above, the core 48' and core-mounting end 53 of the blade 31' of the lifter bar 46' of core lifter 40' is configured to form a core attachment joint 59 of snap-fit construction that is constructed and arranged or otherwise configured to enable the core 48' to be toollessly snapped onto the core-mounting end 53 of the blade 31' of the lifter bar 46' and toollessly snapped off or from the core-mounting end 53 of the blade 31' of bar 46'. Although not shown in FIG. 3, where the core-attachment joint 59 is of snap-fit construction, the core-mounting end 53 of the blade 31' of lifter bar 46' of core lifter 40' has a three-dimensionally contoured portion that snap-fittingly engages with a substantially complementary three-dimensionally contoured portion of the core 48' forming a snap-fit attachment joint 59 therebetween thereby enabling the core 48' to be snapped onto and/or snapped off of the core-mounting end 53 of the blade 31' of bar 46' of core lifter 40' preferably without the use of any tools (e.g., "tool-less" joint 59) or fasteners ("fastener-less" joint 59).

Such a removable core-carrying core lifter 40' configured for attachment of a core 48' during core lifter assembly advantageously produces a core lifter 40' of universal construction further in accordance with the present invention that is adaptable and even customizable by advantageously enabling removable and/or replaceable attachment of cores 48' having different shapes, sizes, and other three-dimensional molding face contours and configurations tailor made for the particular molding application, part or component being molded, and/or molding apparatus in which the custom-tailored or custom-shaped core 48' and removable core-carrying core lifter 40' are installed. In other words, a core lifter 40' constructed in accordance with the present invention like that depicted in FIG. 3 with a lifter bar 46' having a lifter bar blade 31' with a core-mounting end 53 configured to receive a removable or replaceable core 48', preferably via snap-fit attachment, enables cores 48' with a molding face 51' having at least a plurality of different shapes, three-dimensional contours, lengths, widths, depths, thicknesses, and/or sizes to be removably attached thereto in producing a highly customizable or configurable core lifter 40' of the invention with a core 48' customized for the particular molding application, part being molded, and/or molding apparatus. Such a core lifter 40' configured to removably receive such a separate core 48' advantageously not only enables the core 48' to be replaced due to wear and/or tear without having to replace the rest of the core lifter 40', but which also enables such a core lifter 40' of the present invention to be used in the same molding apparatus with a plurality of differently shaped, contoured, or sized cores 48' used with either the same mold or different molds depending on the application and/or part being molded.

With reference once again to FIGS. 1 and 2, the coupling arrangement 50 is formed of (a) a pivotable, translatable and transversely adjustable ball-and-socket coupler 54 disposed at the coupling end 52 of the lifter bar 46 with the coupler 54 preferably formed of or otherwise including the coupling head 57, and (b) an axially translatable ball-and-socket coupler receiver 56 of an elongate core lifter base 58 that operably couples with the coupler 54, preferably coupling with the head 57, thereby coupling the lifter bar 46 to the base 58 in a manner that enables at least one of, and preferably at least a plurality of translation, pivoting and/or tolerance-compensating adjustment of the coupler 54, preferably also the coupling head 57 and at least part of the lifter bar 46, relative to the coupler receiver 56 and base 58 during mold cycling during molding apparatus operation. In a preferred embodiment of the coupling arrangement 50, the coupler 54, preferably with or including the coupling head 57, releasably couples with the base 58 by being received by the coupler receiver 56 thereby operatively coupling the coupler 54, preferably with or including the coupling head 57, and the lifter bar 46 to the base 58 in a manner that enables translation, pivoting and tolerance-compensating adjustment of the coupler 54, preferably also the coupling head 57, and at least part of the lifter bar 46, relative to the coupler receiver 56 and base 58 during mold cycling during molding apparatus operation.

Figure 1:
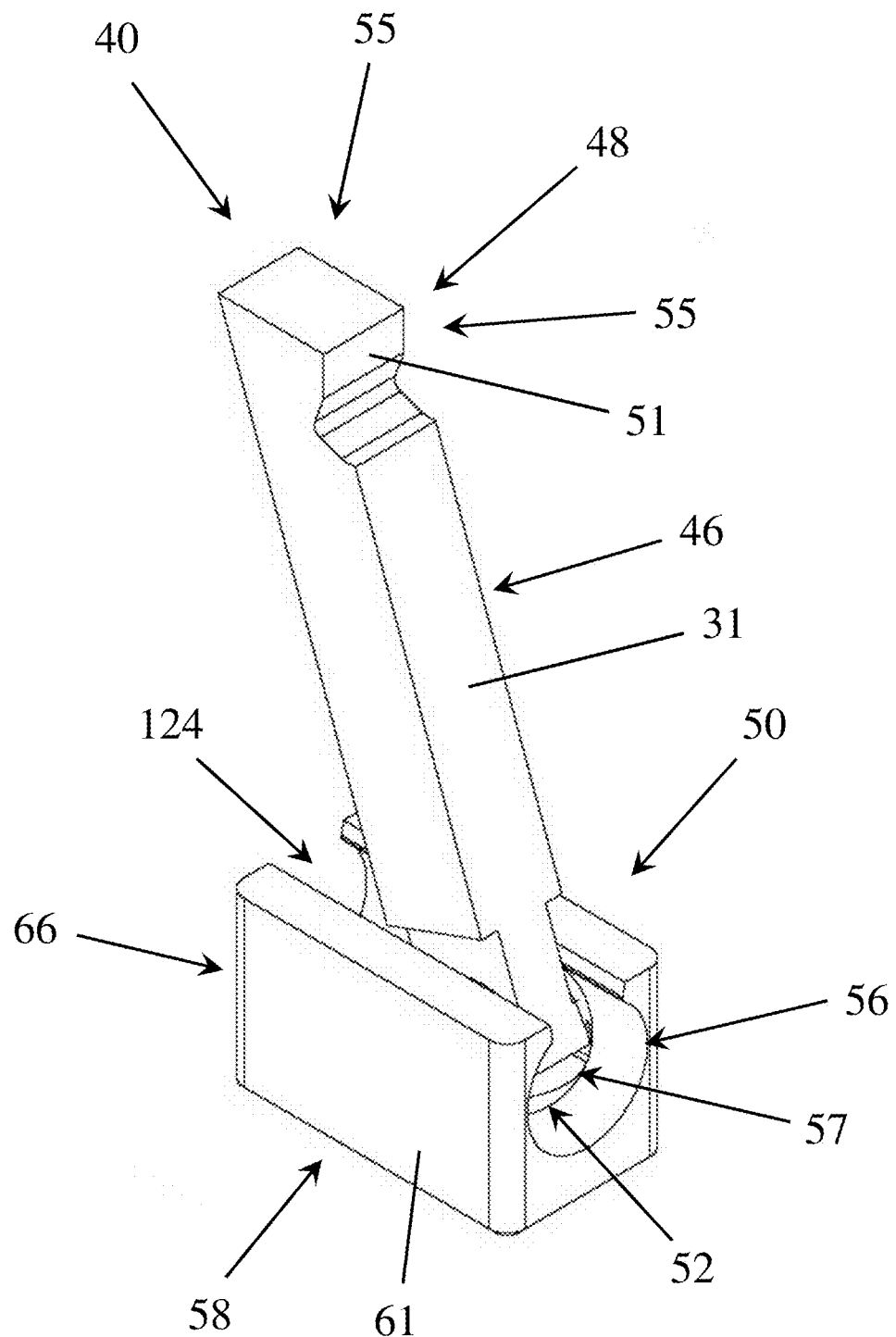
FIG. 1 is a perspective view of a core lifter assembly of the present invention.
Figure 2:
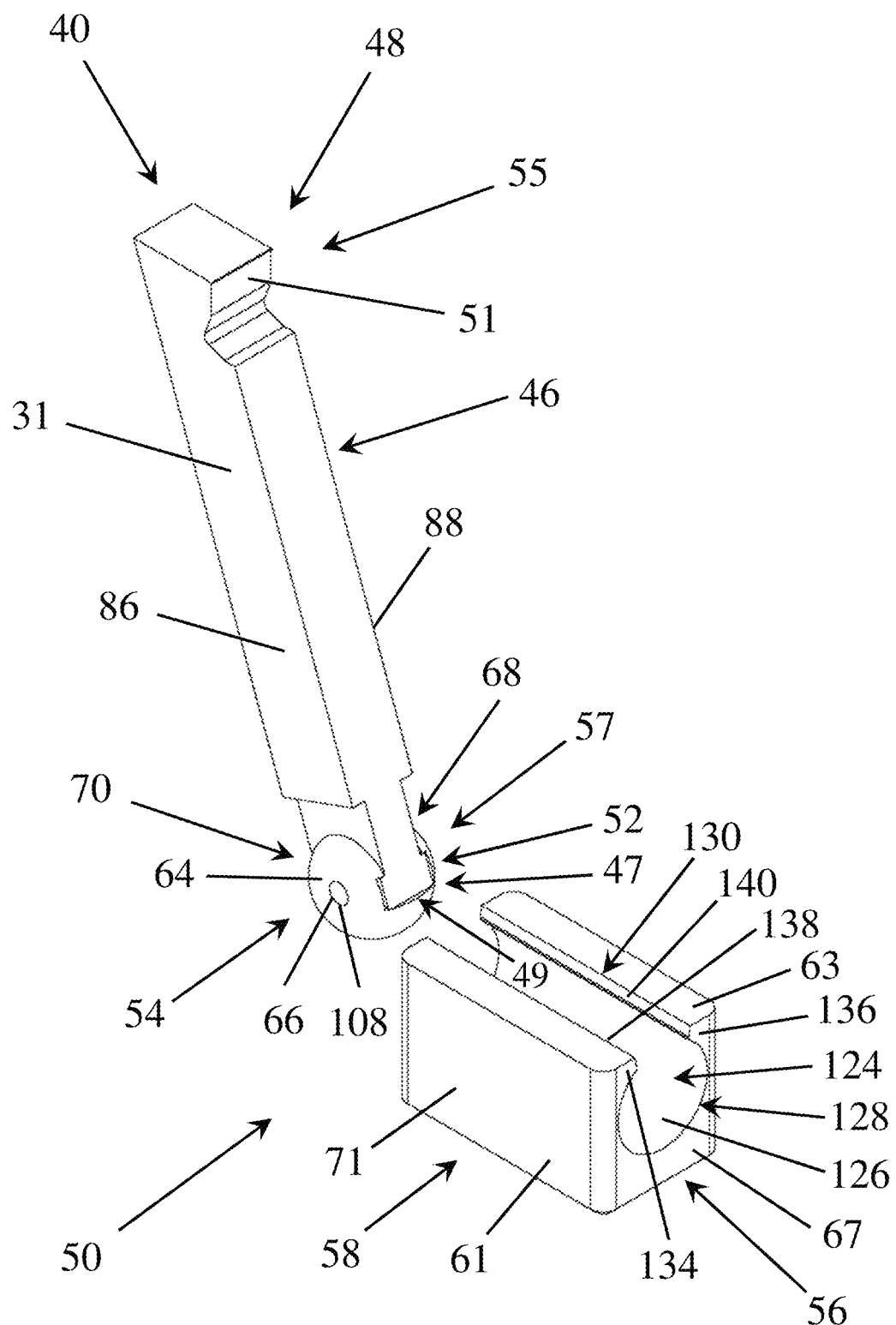
FIG. 2 is a perspective exploded view of a core blade or lifter bar coupler of the lifter and receiver of a core lifter base that is anchored to part of the mold.

In the preferred embodiment depicted in FIGS. 1 and 2, the coupling head 57 of the lifter bar 46 is slidably and rotatively received in the coupler receiver 56 of a core lifter base 58 fixed to an ejector plate or ejector plate assembly of the molding apparatus 42 enabling the lifter bar 46, including its actuator end 55 and/or core 48 carried thereby, to pivot, rotate, and translate relative to or about the base 58 during installation, use and operation of the core lifter 40 during molding apparatus operation. With continued reference to FIGS. 1 and 2, the coupling head 57 is or includes a ball-and-socket type coupler 54 of the lifter bar 46, which preferably is carried or otherwise attached to the lifter bar blade 31, which is slidably, pivotably and/or rotatively received in the coupling receiver 56 formed in the base 58 enabling the lifter bar 46, including core 48, to translate, pivot and/or rotate relative to the base 58 thereby advantageously helping to keep the core lifter 40 from binding during mold cycling during operation of molding apparatus 42. As discussed in more detail below, tolerance compensation can be provided between the coupling head 57 of the lifter bar 46 and lifter bar coupling head receiver 56 of the base 58 in a manner that provides some play therebetween, which can and preferably advantageously does help prevent the core lifter 40 from binding during mold cycling during molding apparatus operation.

With additional reference to FIGS. 12 and 13, one or more such core lifters 40 constructed in accordance with the present invention are assembled and installed in a molding apparatus 42 that preferably is a formable-material molding apparatus 44 and which more preferably a plastics injection molding apparatus 45, with the core lifter base 58 of each core lifter 40 attached, such as by one or more fasteners, to part of the molding apparatus 42 for movement of the base 58 substantially in unison therewith during molding apparatus operation in producing one or more molded parts. In the preferred embodiment shown in FIGS. 12 and 13, the base 58 of each core lifter 40 is removably attached by one or more fasteners, e.g., screws or bolts, to an ejector plate assembly 60 or ejector plate 61 of the molding apparatus 42 substantially immovably fixing or grounding the core lifter base 58 thereto. When the base 58 of each core lifter 40 is fixed or grounded to an ejector plate assembly 60 or ejector plate 61 of the molding apparatus 42, the base 58 of the core lifter 40 moves substantially in unison with the ejector plate 61 of the ejector plate assembly 60 during each molding cycle of molding apparatus operation.

As is also depicted in FIGS. 12 and 12, the elongate lifter bar 46 of each core lifter 40 used in the molding apparatus 42 extends through a corresponding angled lifter guide slot 160 also referred to as a primary release direction slot, into a mold cavity 162 formed in a mold 164 that can (a) have a bottom mold or bottom mold half 166, (b) have a top mold or top mold half 168, or (c) be formed by mating top and bottom halves 166 and 168 of the mold 164 when cycled closed by the molding apparatus 42 during molding apparatus operation. As previously indicated, the base 58 of each core lifter 40 is fixed with fasteners 170 to a respective ejector plate 61 of an ejector plate assembly 60 of the molding apparatus 42 with the elongate bar 46 of each core lifter 40 extending upwardly through its respective guide slot 160 into cavity 162 of mold 164 in which the core 48 disposed at the free end of the lifter bar 46 of corresponding core lifter 40 is used to mold a complementarily shaped feature into the part 65 being molded in the cavity 162 during each molding cycle of opening and closing of the mold 164 during molding operation of the molding apparatus 42.

During opening and closing of the mold halves, the bar 46 of each core lifter 40 can and preferably does slidably ride and be guided in and by the lifter guide slot to guide movement of the core 48 in the mold cavity. In FIGS. 12 and 13, the bar 46 of each core lifter 40 of the molding apparatus 42 is slidably guided in a corresponding guide slot that extends into the mold cavity and is generally in line with the three-dimensional feature or undercut formed by the core 48 in the molded part. The portion of the lifter bar 46 that carries or is integrally formed with the core 48 extends into the mold cavity when the mold halves are closed to cause the core 48 to mold a feature of a shape complementary to the core 48 in the part being molded and which helps clear the molded part during ejection. An example of the construction of such a molding apparatus 42 that is a plastic injection molding apparatus 45 for which use of one or more core lifters 42 of the present invention is particularly well suited is shown and described in U.S. Pat. No. 5,316,466, the entirety of which is expressly incorporated herein by reference.

Figure 6:
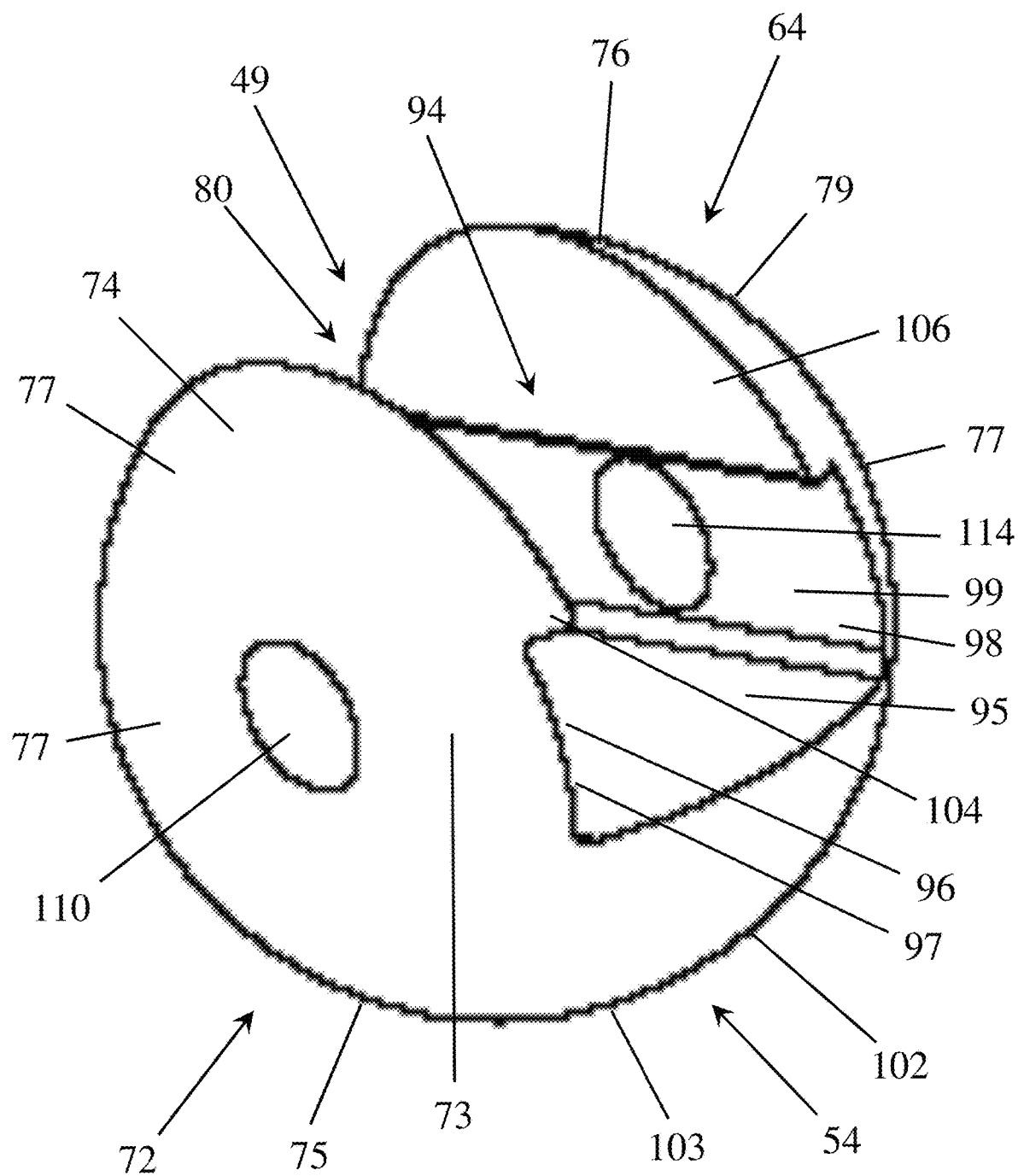
FIG. 6 is a fragmentary front elevation of the coupler ball adjustably mounted to a coupling head at a free end of the core blade or lifter bar forming a coupler assembly where play between the coupler ball and coupling head facilitates alignment and dynamic adjustment during core lifter assembly, core lifter installation, core lifter use, and mold operation.
Figure 7:
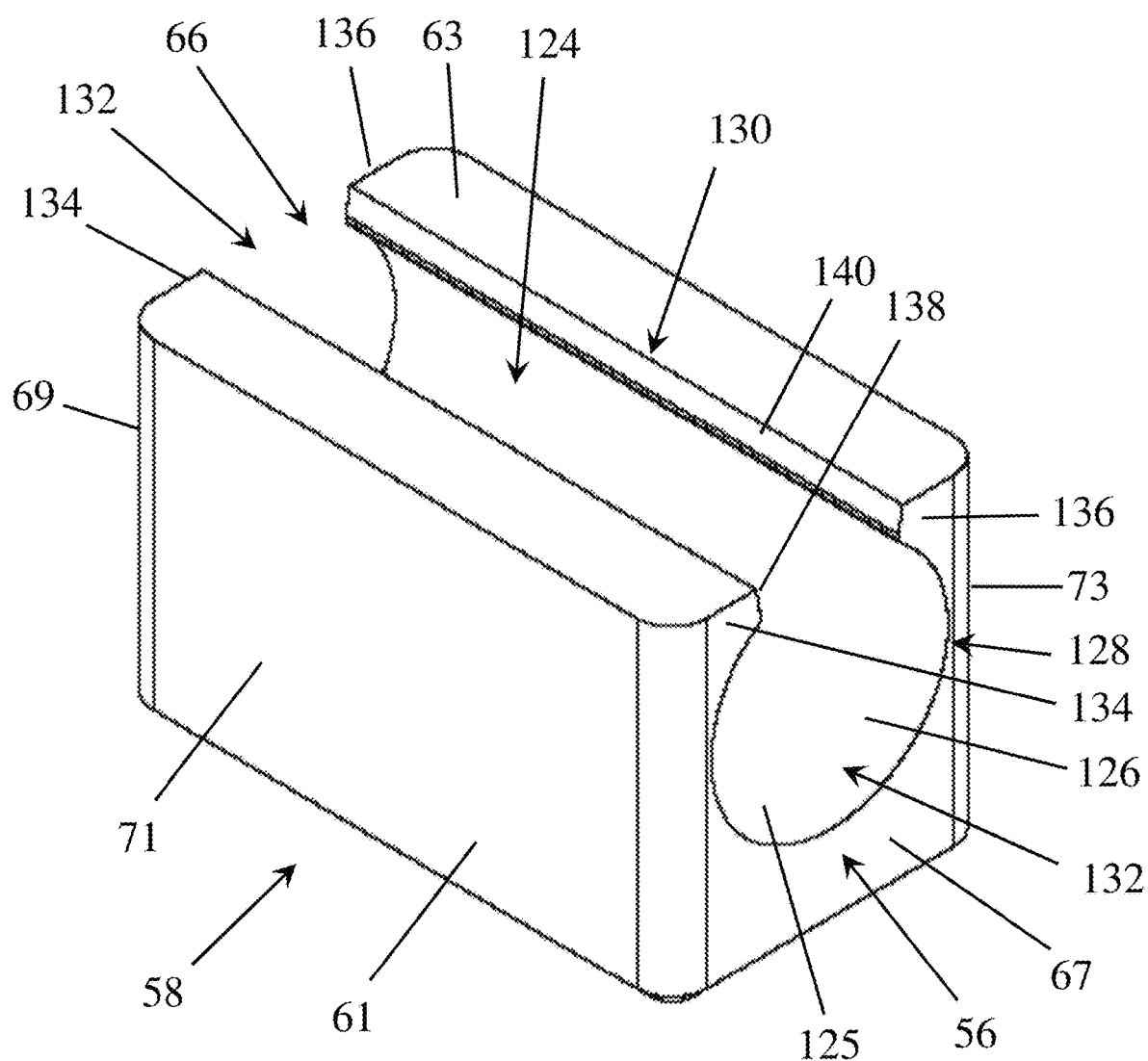
FIG. 7 is a perspective view of the core lifter base illustrating an elongate longitudinally extending bearing raceway in which the coupler ball of the coupler assembly is slidably, pivotably and rotatively received when assembly of the core lifter is completed.

With reference once again to FIGS. 2-5, the core lifter bar coupler 54 has its coupling head 57 disposed at a coupling end 52 of the core lifter bar blade 31 of the core lifter bar 46. FIG. 6 depicts a preferred coupling head 57 of the coupler 54 that is a generally round, preferably substantially spherical, core lifter bar coupling ball 64 which is shown in FIG. 6 detached from the blade 31 of the lifter bar 46 thereby illustrating in FIG. 6 the coupling ball 64 in more detail by showing the ball 64 all by itself. FIG. 7 shows in more detail the coupler receiver 56 of the core lifter base 58 that receives the core lifter bar coupling ball 64 when the core lifter bar 46 is assembled, preferably coupled, to the base 58 in a manner that permits slidable translation of the lifter bar 46 along the base 58 during molding apparatus operation. The base 58 of such a core lifter 40 of the present invention is shown all by itself in FIG. 7 with the core lifter bar 46 detached or disengaged to show the base 58, including its coupler receiver 56, in more detail.

Figure 8:
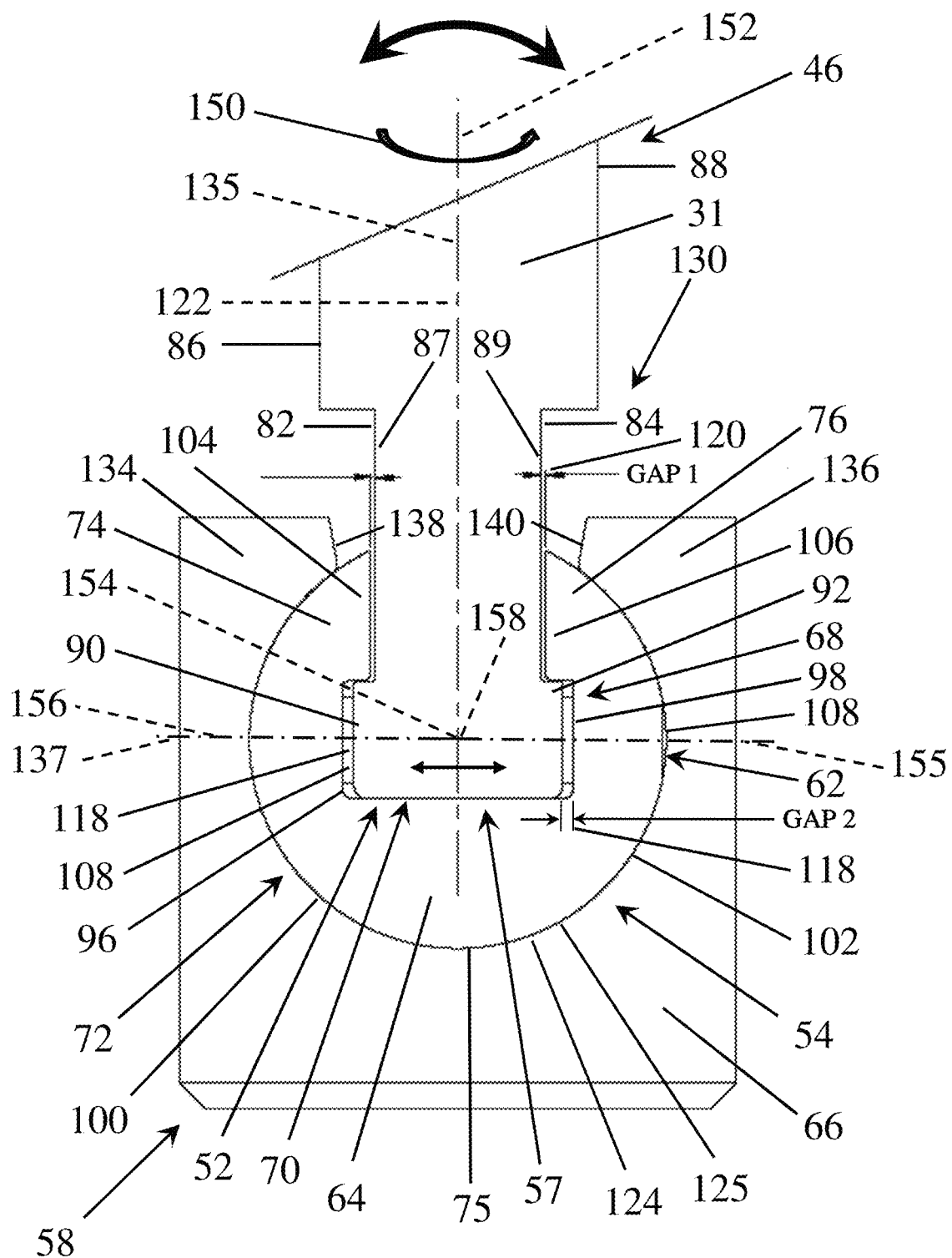
FIG. 8 is a fragmentary front elevation of the coupler ball adjustably mounted to a coupling head to form the core blade or lifter bar coupler assembly that is slidably, pivotable and rotatively received in the bearing raceway of the receiver of the core lifter base.

With additional reference to FIG. 8, the coupler receiver 56 preferably is, includes, is configured with, or is configured as an elongate generally straight core lifter bar guide shoe 66 integrally formed in the base 58 extending longitudinally along the base 58 that movably receives the core lifter bar coupling ball 64 thereby movably coupling the bar 46 and any core 48 carried by the bar 46 to the base 58 in a manner that slidably guides movement of the ball 64 and blade 31 of the bar 46 along the shoe 66 in a lengthwise direction relative to the base 58. In a preferred embodiment, the guide shoe 66 preferably is or includes an elongate longitudinally extending channel 124 formed in the base 58 that extends in a lengthwise direction of the base 58 along the base 58 and which has a cross-sectional-contour generally complementary to that of the coupling head 57 of the lifter bar 46. Where the coupling head 57 is or includes coupling ball 64, the guide shoe 66, including such an elongate longitudinally extending channel 124 of the shoe 66 formed in the base 58, preferably has a cross-sectional contour transverse to the direction of coupling ball translation relative to the base 58 that is substantially complementary to that of the coupling ball 64.

When the lifter bar coupling ball 64 is received in the core lifter bar guide shoe 66 in the manner depicted in FIGS. 1 and 8, the lifter bar 46 becomes movably coupled to the lifter base 58 enabling the ball 64 and blade 31 of the lifter bar 46 to translate preferably by sliding generally in a straight-line direction along the shoe 66 substantially along the length of the channel 124 of the shoe 66 while being slidably guided by the shoe 66 in a lengthwise direction relative to the base 58 in either direction along the shoe 66 during molding apparatus operation. As the coupled ball 64 translates generally in a straight line longitudinal or lengthwise direction relative to the base 58 during molding apparatus operation, so generally does the rest of the lifter bar 46, including the lifter bar blade 31 and core 48, because the bar 46 is operatively connected to the ball 64, such as in the manner depicted in FIG. 2, thereby enabling such movement, preferably via translation, of the bar 46 relative to the base 58, as well as relative to parts of the molding apparatus 42 to or in which the base 58 is fixed, during mold cycling during molding apparatus operation. To facilitate smooth and long lasting operation, the lifter bar coupling ball 64 preferably is made of a durable material that can be and preferably which also is reduced friction construction, such as a coupling ball 64 made of or from a round metal or metallic ball, e.g., a round or spherical steel ball bearing, of hardened construction. In a preferred embodiment, the lifter bar coupling ball 64 is made of or from a carbide ball with one such preferred coupling ball 64 being made of or from a round or spherical carbide ball bearing.

With specific reference to FIGS. 2-5, the lifter bar coupling ball 64 is disposed at an end of the blade 31 of the lifter bar 46 opposite the core 48 with the ball 64 slidably coupling with an elongate guide shoe 66 of the coupler receiver 56 formed in the base 58 enabling the ball 64 to at least translate or move in the guide shoe 66 relative to the base 58 in either direction along the base 58 along substantially the length of the guide shoe 66, including while being able to pivot, swivel, and/or rotate about at least one axis and preferably at least a plurality of axes relative to the base 58 (a) during self-adjustment, self-alignment, tolerance compensation, misalignment compensation, and/or misalignment adjustment of the core lifter 40 during assembly of the core lifter 40 and/or installation of the core lifter 40 in the molding apparatus 42, and (b) during cycling of the mold(s) of the molding apparatus 42 in which the core lifter 40 is installed during operation of the molding apparatus 42. As a result of the elongate substantially straight channel 124 of the guide shoe 66 having a generally transverse cross-section that is substantially complementary to or with a generally spherical shape of at least the portion of the coupling ball 64 that comes in contact with the channel 124, the coupling ball 64 and channel 124 of the shoe 66 forms a lifter bar guide arrangement along which the lifter bar 46 translates relative to the base 58 in a substantially straight line along the channel 124 and guide shoe 66 during core lifter self-adjustment, self-alignment, tolerance compensation, misalignment compensation, and/or misalignment adjustment in or along a fore-aft direction of the core lifter 40 in the longitudinal or lengthwise direction relative to the base 58.

The slidable movement of the guide ball 64 in the guide shoe 66 of a core lifter 40 of the present invention facilitates movement that preferably is self-aligning movement or self-adjusting movement of the lifter bar 46 relative to the guide shoe 66, relative to base 58, and relative to one or more parts of the molding apparatus 42 in a manner that advantageously prevents binding of the bar 46 or core 48 of the core lifter 40 with any part of the mold apparatus 42 during operation of the mold apparatus 42. Where the molding apparatus 42 is a plastic injection molding apparatus 45, slidable movement of the ball 64 in the channel 124 of the guide shoe 66 also facilitates movement of the blade 31 of the lifter bar 46 relative thereto, relative to base 58, and relative to one or more parts of the plastic injection molding apparatus 45 during mold closing, during injection molding of a plastic part 65 (FIGS. 12 and 13), and during mold opening, including during plastic part ejection during mold opening.

In the preferred core lifter embodiment shown in the drawing figures, the core lifter bar coupling ball 64 can be and preferably is attached to the coupling end 52 of the blade 31 of the lifter bar 46 by a ball coupling joint 47 formed between a three-dimensionally contoured coupling end 52 of the blade 31 and a three-dimensionally contoured lifter bar coupling end receiving socket 49 formed in the ball 64 that is configured to receive the three-dimensionally contoured coupling end 52. As discussed below in more detail, the coupling end 52 of the blade 31 of the lifter bar 46 and the coupling socket 49 formed in the ball 64 can form a ball coupling joint 47 where there is some play or tolerance compensation between the ball 64 and lifter bar coupling end 52 of the core lifter bar blade 31. In another preferred embodiment, the ball 64 is substantially immovably fixed to the end 52 of the blade 31 of the lifter bar 46 with the coupling joint 47 preferably configured in a manner that facilitates substantially immovable fixing of the ball 64 to the end 52 of the blade 31 of the bar 46.

Figure 4:
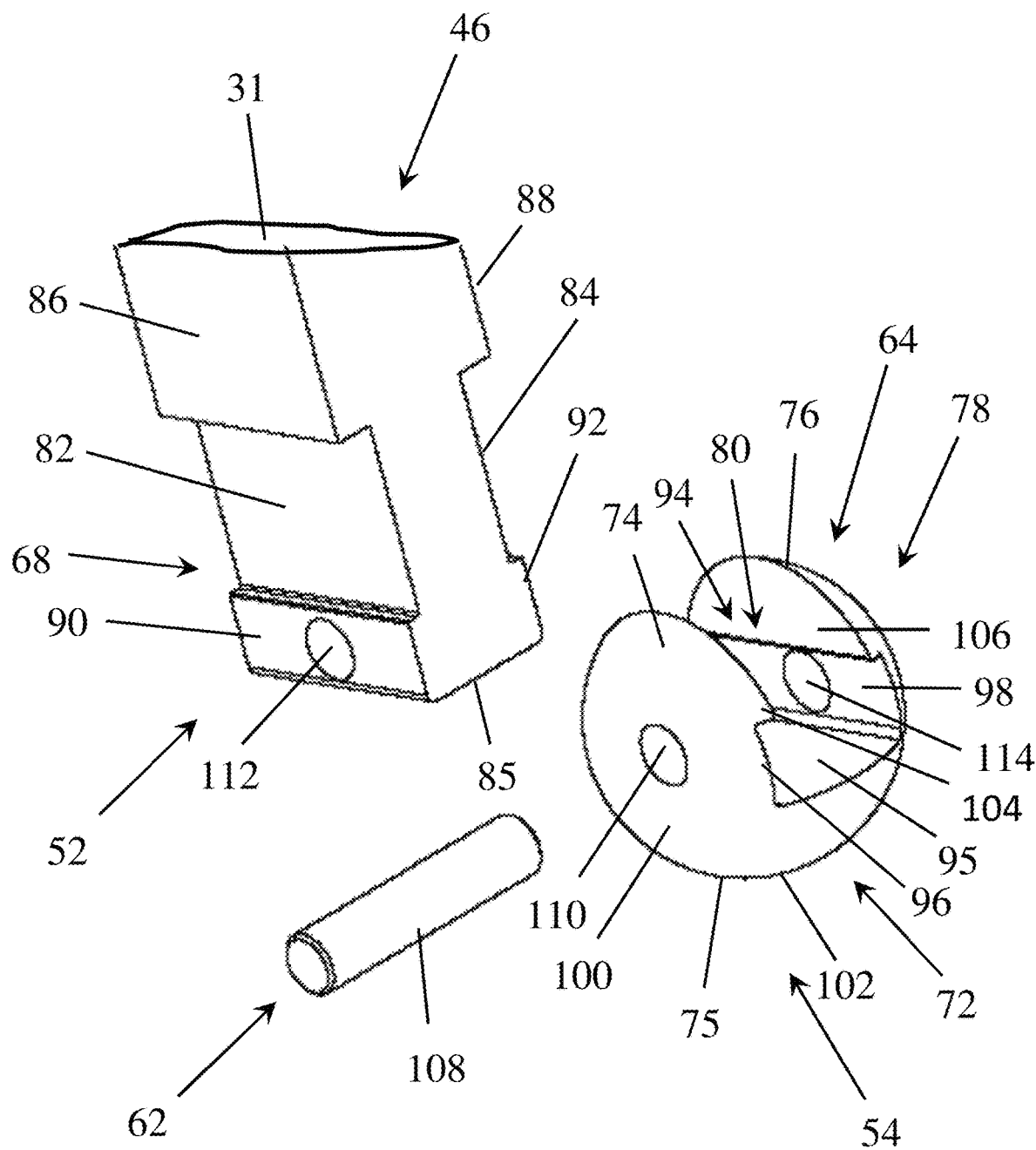
FIG. 4 is an enlarged fragmentary perspective view of the coupler assembly.
Figure 5:
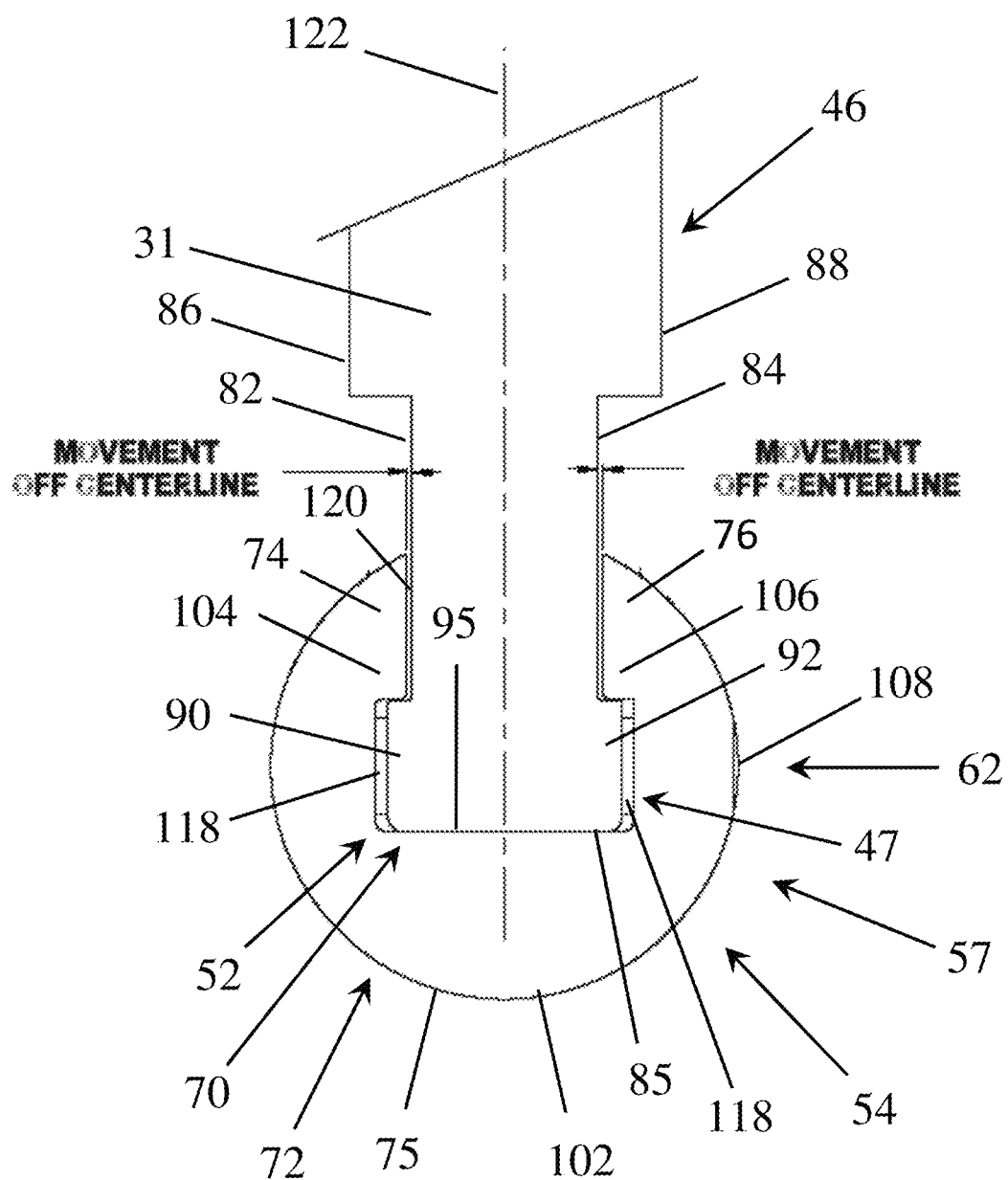
FIG. 5 is an enlarged perspective view of a coupler ball of the coupler assembly.

With continued reference to FIGS. 2-5, a retainer 62 can be used to help attach the coupling ball 64 to the end 52 of the blade 31 of the lifter bar 46, including when the ball 64 and lifter bar blade end 52 are configured to form a coupling joint 47 when engaged with one another in the manner depicted in FIG. 5. Where configured to help facilitate lifter bar and/or core alignment, adjustment or tolerance compensation, such a retainer 62 can be employed to help attach the ball 64 to the end 52 of the blade 31 of the bar 46 to form a tolerance-compensating coupling joint 47 but which preferably also is configured to enable or otherwise facilitate self-alignment, self-adjustment, tolerance compensation, misalignment compensation, and/or misalignment adjustment of the ball 64 relative to the coupling end 52 of the blade 31 thereby advantageously helping to facilitate self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed.

Such a coupling joint 47 formed between the ball 64 and coupling end 52 of the lifter bar blade 31 preferably is of releasable or detachable construction enabling detachment or disassembly of the ball 64 from the end 52 of the blade 31 enabling a worn ball 64 to be replaced with a new one, if desired. In the preferred embodiment depicted in FIGS. 2-5, a coupling joint 47 of releasable or detachable construction is formed with or using such a retainer 62 that is inserted into engagement with the ball 64 and coupling end 52 of the blade 31 to positively and securely attach the ball 64 to the blade 31 and which is a retainer 62 that is disengaged or otherwise removed from the ball 64 and coupling end 52 of the blade 31 to enable detachment of the ball 64. When detached, the ball 64 can be replaced with another ball 64, such as a new ball 64, one of a plurality of different types of balls having a plurality of different hardness's, outer surface contours, shapes, sizes and/or the like that is releasably and positively secured to the coupling end 52 of the blade 31 using the retainer 62.

Where the coupling joint 47 is a tolerance compensating joint formed between the ball 64 and coupling end 52 of the lifter bar blade 31, the ball 64 preferably is releasably or detachably mounted to the coupling end 52 of the blade 31 of the lifter bar 46 in a manner that also provides some play therebetween that allows or facilitates self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed, including during molding apparatus alignment. While it is contemplated that such a tolerance compensating joint 47 can be formed without the use of any retainer 62, the preferred embodiment of the joint 47 shown in FIGS. 2-5 employs a retainer 62 that preferably is of removable or detachable construction thereby also enabling removal and replacement of ball 64, if needed.

When the ball 64 is attached, coupled or otherwise mounted to the lifter bar blade 31 in forming such a tolerance compensating and releasable coupling joint 47, such as in the manner depicted in FIGS. 2-5, limited relative movement therebetween advantageously enables at least one of and preferably at least a plurality of angular adjustment and translation by permitting limited rotational and/or pivotable movement and/or limited translational movement between the ball 64 and lifter bar blade 31'. Such a tolerance compensating releasable coupling joint 47 that employs retainer 62 preferably is a tolerance compensating releasable coupling joint 47 that is configured to enable or otherwise facilitate alignment adjustment of the core 48 and bar 46 relative to the ball 64 and/or base 58 when the ball 64 is received in the guide shoe 66 of the base 58. In one such preferred embodiment, the joint 47 is configured to provide tolerance compensation by being configured to provide a very slight amount of play between the three-dimensionally contoured coupling end 52 of the lifter bar 46 and the socket 49 formed in the ball 64 because doing so advantageously facilitates self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed, including during molding apparatus operation.

Where a retainer 62 is employed, a preferred retainer 62 is an elongate generally cylindrical retainer pin 108 like that shown in FIG. 4 that extends through a pair of spaced apart arms 74, 76 of coupling socket 49 and through part of the lifter bar 46 at or adjacent the coupling end 52 of the bar 46 in the manner depicted in FIGS. 2 and 3. As shown in FIGS. 2-6 and 8, a preferred core lifter embodiment has the coupling ball 64 attached to the coupling end 52 of the blade 31 of the lifter bar 46 with such an elongate generally cylindrical retainer pin 108 in a manner that permits or allows some slight relative movement or play between the ball 64 and blade 31 of the bar 46, particularly at or adjacent the coupling end 52 of the blade 31 where the ball 64 is attached thereto. Where the ball 64 is attached at or to the coupling end 52 of the blade 31 of the bar 46 in a manner that permits some misalignment adjusting or tolerance compensating play, the ball 64 is attached, such as via retainer 62, preferably via retain pin 108, in a manner that can and preferably does permit some slight relative movement or play between the ball 64 and the blade 31 of the bar 46, particularly at or adjacent the end 52 of the blade 31 of the bar 46.

In another preferred embodiment, the coupling ball 64 is attached to the coupling end 52 of the blade 31 of the lifter bar 46 using a joint 47 of similar or substantially identical construction employing a method and arrangement of attachment that substantially immovably fixes the core lifter bar coupling ball 64 to the core lifter bar blade 31 in a manner that prevents relative movement between the ball 64 and blade 31 of the bar 46 during use and operation of such a core lifter 40, including during molding apparatus operation. In one such preferred embodiment, the coupling ball 64 is attached to the coupling end 52 of blade 31 with a retainer 62, such as a retainer pin 108, in a manner that substantially immovably fixes the ball 64 to the coupling end 52 of the blade 31 producing a lifter bar 46 having an immovably fixed lifter bar coupling ball 64 at the end of the bar 46 that movably couples with the base 58. In another such preferred embodiment, the ball 64 is affixed to the end 52 of the bar 46 in a manner that substantially immovably fixes the ball 64 to the bar 46. In another preferred embodiment, the coupling ball 64 and coupling end 52 of the lifter bar blade 31 are three dimensionally configured substantially as shown in FIGS. 2-6 and 8-9 but which lack or do not require any retainer 62 to produce such a joint 47 that substantially immovably mounts the ball 64 to the blade 31 of the lifter bar 46.

Even when the ball 64 substantially immovably mounted to the blade 31, such a joint of substantially immovable or fixed construction can be of a releasable or detachable configuration that enables the ball 64 to be detached or disengaged from the end 52 of the blade 31 of the lifter bar 46. In the preferred embodiment shown in the drawings where the joint 47 includes retainer 62, preferably retainer pin 108, removal of the retainer 62 preferably by removing the pin 108 from being engaged with the ball 64 and coupling end 52 of the core lifter bar blade 31 enables detachment or disengagement of the ball 64 from the blade 31.

Where the coupling ball 64 is attached at or to the end 52 of the lifter bar 46 in a manner that allows some relative movement therebetween, such as by being configured with some play therebetween, the ball 64 can be and preferably is attached by a retainer 62 to a lifter bar blade coupling head 68 formed at or in a free end, preferably the coupling end 52, of the blade 31 of the lifter bar 46 forming an alignment adjusting motion-limited lifter bearing knuckle joint 70 that can be and preferably is configured, e.g., dimensioned, so there is a limited amount of side-to-side play, preferably a predetermined amount of side-to-side play, movement off centerline (FIG. 6), GAP 1 or GAP 2 (FIG. 8) of at least 0.005 inches therebetween that facilitates alignment adjustment, e.g., automatic adjustment and/or self-alignment of the ball 64 relative to the lifter bar 46. The ball 64 and head 68 preferably are dimensioned to provide a predetermined amount of side-to-side play, movement off centerline, or GAP 1 of at least about 0.005 inches that enables side-to-side play or side-to-side alignment adjustment of ball 64 relative to head 68 (or vice versa). Depending on the size of the scalable core lifter 40, the ball 64 and head 68 of lifter bar blade 31 can be dimensioned and toleranced to produce a side-to-side play, movement off centerline, GAP 1 or GAP 2 of as much as 0.030 inches per side or a total of side-to-side play of 0.060 inches. In a preferred embodiment, such a core lifter 40 of the present invention is dimensioned and toleranced to have a side-to-side play, movement off centerline, GAP 1 of between 0.005 inch and 0.1 inch and preferably between about 0.005 inch and 0.060 inches.

By the ball 64 being mounted to the lifter bar blade coupling head 68 of the blade 31 of the lifter bar 46 in the manner depicted in FIG. 6, it allows the ball 64 to move side-to-side relative to the bar 46 independently of pivoting, rotation or swiveling as side-to-side adjustment permitted by such play occurs without changing the angle of pivot, swivel or rotation of the bar 46. Such side-to-side relative movement between the ball 64 and head 68 advantageously permits side-to-side adjustment of the bar 46 independent of swiveling, pivoting, or rotation of the bar 46 facilitating self-alignment and self-adjustment of the core lifter 40 during core lifter assembly, during core lifter installation into a molding apparatus 42, during core lifter use, and during molding apparatus operation.

With reference to FIGS. 4-6, the ball 64 is generally round and preferably substantially spherical with the coupling socket 49 formed of a lifter bar end receiving seat 80 recessed in the ball 64 that receives a free end of the lifter bar 46 that preferably is the coupling end 52 of the bar 46 during assembly of the bar 46 to the ball 64. As is best shown in FIG. 6, the lifter bar end receiving seat 80 preferably is formed of a channel 94 formed in the ball 64 between which is disposed a pair of spaced apart and generally parallel arms 74, 76 that bracket opposite sides of the portion of the coupling end 52 of the lifter bar 46 that is received in the channel 94 during assembly of the bar 46 to the ball 64.

Extending outwardly of the seat 80 and channel 94 and extending outwardly of or from the arms 74, 76 of the ball 64 is a rounded outer bearing cap 75 having a convexly rounded outer surface 100 that preferably is a generally round bearing surface 102 of the ball 64. When the ball 64 is received in the elongate longitudinally extending channel 124 of the core lifter bar guide shoe 66 of the receiver 56 when the lifter bar 46 is movably attached to the base 58, the rounded bearing surface 102 of the ball 64 movably, preferably slidably, bears against or contacts an internal bearing surface 125 that extends along the interior of the channel 124 of the shoe 66 of the receiver 56 formed in the base 58 substantially along the length of the channel 124 or shoe 66. In a preferred embodiment, the ball 64 preferably is a bearing, more preferably a substantially spherical ball bearing, which preferably is a hardened bearing, which more preferably is a carbide ball bearing, having a coupling socket 49 formed therein that is formed of a lifter bar end receiving seat 80 that is formed of a channel 94 defined between arms 74, 76.

Where the ball 64 is attached to the coupling end 52 of the lifter bar 46 in a manner that permits some relative movement therebetween, such as when the ball 64 and coupling end 52 are configured to have some play therebetween, the ball 64 can be and preferably is formed of a substantially round or substantially spherical ball bearing 72 with the coupling socket 49 formed of a recessed lifter bar end or lifter bar coupling head receiving seat 80 formed by a channel 94 formed through the bearing 72 or ball 64. As shown in FIG. 6, channel 94 is substantially straight and extends from and through one side of the bearing 72 or ball 64 to and through an opposite side of the bearing 72 or ball 64.

Where the ball 64 is attached to the coupling end 52 of the lifter bar 46 in a manner that permits some relative movement therebetween, a preferred ball 64 is formed of or from a generally U-shaped ball bearing 72 having an outer bearing cap 75 from which a pair of spaced apart and generally parallel hinge knuckle arms 74, 76 outwardly, preferably upwardly, extend defining a hinge knuckle yoke 78 with a recessed core lifter bar coupling head receiving seat 80 disposed between the knuckle arms 74, 76. Outer bearing cap 75 preferably is defined by a convexly rounded outer surface 100 that preferably is a rounded outer bearing surface 102 that preferably is substantially smooth, preferably at least partially spherical, and which can be substantially spherical. As best shown in FIG. 5, this includes corresponding convexly rounded outer sides or side surfaces 77, 79 of knuckle arms 74, 76 of the ball 64 which are each at least partially spherical, preferably is substantially spherical, and preferably also substantially smooth. This also includes a convexly rounded bottom or bottom outer surface 103 of the ball 64 which also is at least partially spherical, preferably is substantially spherical, and preferably also substantially smooth.

When the ball-and-socket coupler 54 is received in the coupler receiver 56 of the core lifter base 58, the outer bearing surface 102 of the generally hemispherical outer bearing cap 75 of the U-shaped ball bearing 72 of the bar-coupling guide ball 64 of the lifter bearing knuckle joint 70 slidably rides along the receiver 56 in a manner that permits rotation, twisting, swiveling, and/or angular changes about at least a plurality of axes, preferably at least a plurality of pairs, i.e., at least three, of axes, and producing a core lifter 40 constructed in accordance with the present invention possessing at least a plurality of degrees of freedom, and preferably possessing at least a plurality of pairs, i.e., at least three, degrees of freedom that is substantially self-aligning.

When the ball 64 is received in the socket provided by receiver 56, the core lifter 40 can swivel 150, such as depicted in FIG. 8, about a swivel axis 152 of the core lifter bar 46 that extends longitudinally or lengthwise through the lifter bar 46 and a center 154, e.g., center point, of the ball 64 and which preferably also is substantially coincident with the longitudinal lifter bar axis 122. As is shown in FIG. 8, lifter bar blade swivel axis 152 extends longitudinally or lengthwise through the center or through a centerline of the blade 31 of the lifter bar 46 and through a point of the ball 64 that defines or is disposed at the center of the ball 64. In the preferred embodiment shown in FIG. 8, the center 154, e.g., center point, of the ball 64 is located in the channel 94 of the lifter bar receiving seat 80 of the lifter bar coupling socket 49 with the center 154 of the ball 64 being disposed in a portion of the lifter bar blade coupling end 52 or lifter bar blade coupling head 68 of the blade 31 of the lifter bar 46.

In a preferred embodiment, the center 154 of the ball 64 is the same as or substantially coincident with the geometric center or geometric center point, e.g., three-dimensional geometrical or three-dimensional center point, of the ball 64 if the ball 64 were a solid spherical ball, e.g., solid round ball or solid sphere. Such a center point or center 154 of the ball 64 is the location of the x, y, z point in or of the center of the ball 64 if the ball 64 was an uninterrupted round ball or uninterrupted sphere.

With continued reference to FIG. 8, the blade 31 and lifter bar 46 are oriented generally uprightly with the blade 31 of the bar 46 extending upwardly from the base 58 in a direction generally parallel to a vertical axis 135 of the base 58 that vertically bisects the base 58 and extends through the center 154 of the ball 64 generally perpendicular to a horizontal axis 137 of the base 58 that preferably bisects the channel 124 or bearing race 126 and extends through the center 154 of the ball 64 movably and rotatively captured in the channel 124 and bearing race 126. With the lifter bar 46, blade 31 and ball 64 oriented as shown in FIG. 9, the vertical axis 135 of the base 58 is substantially coincident with the longitudinal core lifter bar blade center axis 122 that also extends through the center 154 of ball 64.

The lifter bar blade coupling head 57 is disposed at or adjacent the coupling end 52 of the elongate and straight blade 31 of the lifter bar 46 that carries the ball 64 with the ball 57 preferably being coupled to the coupling head 57 at or adjacent the coupling end 52 of the bar 46, such as in the manner shown in FIGS. 2-6 and 8-9 and described in more detail elsewhere herein. As depicted in FIGS. 2-5 and 8-9 and discussed in more detail elsewhere herein, the coupling head 57 is a three-dimensionally contoured head disposed at or adjacent the coupling end 57 of the blade 31 of the lifter bar 46 that is configured for coupling with the ball 64 in a manner that securely and positively retains or mounts the ball 64 thereto.

Such a core lifter 40 constructed in accordance with the present invention can swivel 150 such that the blade 31 of the lifter bar 46 rotates about the swivel axis 152 extending through the bar 46 at least 10 degrees, preferably at least 20 degrees, and preferably between 20 degrees and 360 degrees. Because the ball 64 is round or spherical, the ball 64 preferably rotates substantially in unison with the blade 31 of the bar 46 about the swivel axis 152 when the bar 46 is swiveling relative to or about the longitudinal central base axis 135 and/or the longitudinal central lifter bar blade axis 122. In a preferred embodiment, core 48 and lifter bar 46 can swivel about the swivel axis 152 more than 360 degrees, e.g., can continuously swivel about the swivel axis 152. In a preferred embodiment for each of the above swivel angular extents, the blade 31 of the lifter bar 46 preferably rotates or spins about its central longitudinal axis 122 when swiveling about the swivel axis 152, such as when swiveling to self-align, automatically adjust, tolerance compensate, compensate for misalignment, and/or misalignment adjust during assembly of core lifter 40, during installation of core lifter 40 into molding apparatus 42, and/or during use and operation of the core lifter 40, including during mold cycling, part or component ejection, and/or the like during operation of molding apparatus 42. Where the blade 31 of the lifter bar 46 extends generally perpendicularly upwardly from the base 58 straight up from the base 58 in the manner depicted in FIG. 8, the swivel axis 152 preferably is substantially coincident with both the vertical central longitudinal base axis 135 and the central longitudinal lifter bar axis 122, such as is shown in FIG. 8.

With reference to FIGS. 5 and 8, the core lifter bar coupling head 68 is formed in the coupling end 52 of the lifter bar 46 that preferably is a generally I-shaped coupling head 68 with a pair of spaced apart transversely extending knuckle arm guide channels 82, 84 formed in opposite sides 86, 88 of the lifter bar 46 at or adjacent the coupling end 52 from which a respective coupling head guide rib 90, 92 extends outwardly at or adjacent the free end of the bar 46. With reference to FIGS. 4-8, the lifter bar blade coupling head receiving seat 80 formed in the ball 64 preferably is a generally transversely extending channel 94 of generally I-shaped cross-section having a pair of spaced apart, opposed and generally parallel guide slots 96, 98, each of which slidably receive and guide a corresponding rib 90, 92 of the lifter bar blade coupling head 68 during assembly of the lifter bearing knuckle joint 70. The seat 80 includes guide slots 96, 98, formed a distance below or radially inwardly of the outer surface 100 of the ball 64 which thereby also define a pair of opposed generally inturned coupler ball guide ribs 104, 106 slidably received in and guided by a corresponding one of the knuckle arm guide channels 82, 84 of the lifter bar blade coupling head 68 when coupling head ribs 90, 92 of the coupling head 68 are received in guide slots 96, 98 during assembly of the core lifter bearing knuckle joint 70.

With reference to FIGS. 1-6, the ball 64 engages and preferably covers the coupling head 68 of the lifter bar 46 and preferably fits like a cap over the coupling head 68 of the when the ball 64 is slid over the head 68 during assembly of the ball 64 to the coupling head 68 of the lifter bar 46 forming the core lifter bearing knuckle joint 70 with the outer bearing surface 102 of the portion of the ball 64 that defines the bearing cap 75 functioning as a bearing when the ball 64 is slidably disposed in the receiver 56 of the core lifter base 58. The coupling head 68 can and preferably does have an endwall 85 at its free end that overlies an endwall 95 of channel 94 formed in ball 64 and which can abut or stop against endwall 95 to limit relative motion between the ball 64 and head 68 when assembled together to form core lifter bearing knuckle joint 70. As depicted in FIGS. 3-6, lifter bar blade coupling head endwall 85 can be and preferably is generally flat or substantially planar and coupler ball channel endwall 95 can be and preferably also is generally flat or substantially planar.

If desired, the coupler ball 64 can be attached to the coupling head 68 of the blade 31 of the lifter bar 46 by a retainer 62 that can be and which preferably is a pin 108 that can be and which preferably is of elongate and generally cylindrical construction. In the preferred embodiment of a core lifter 40 of the present invention shown in the drawing figures, assembly of the core lifter bearing knuckle joint 70 preferably is completed by inserting the retainer 62, preferably pin 108, through a ball coupling retainer receiving bore 110 in one of the knuckle arms 74, through a ball coupling retainer receiving bore 112 in the coupling head 68, and through a ball coupling retainer receiving bore 114 in the other one of the knuckle arms 76 in the manner depicted in FIGS. 2-5 and 8-9 thereby forming knuckle joint 70 and coupling the ball 64 to the bar 46. Where the ball 64 is coupled by a retainer 64, such as retainer pin 108, to the coupling head 68 of the lifter bar 46 at the coupling end 57 of the bar 46, the ball coupling retainer receiving bores 110 and 114 of the ball 64 are through bores that are substantially coaxial with one another with one of the bores 110 extending completely through one arm 74 of the ball 64 and the other one of the bores 114 extending completely through the other arm 76 of the ball 64 as shown in FIG. 6. Where the ball 64 is coupled by a retainer 64, such as retainer pin 108, to the coupling head 68 of the lifter bar 46 at the coupling end 57 of the bar 46, the coaxial bores 110 and 114 can and preferably do extend through the ball 64 at or adjacent a centerline 155 of the ball 64 as depicted in FIG. 8 in a direction transverse or generally perpendicular to the longitudinal or lengthwise extent of the lifter bar 46 coupled thereto by retainer 64, e.g., by retainer pin 108. As disclosed in more detail elsewhere herein and depicted in FIGS. 8 and 9, except for the recessed seat 80, e.g., channel 94, of the coupling socket 49 formed in the ball 64, the ball 64 is round and preferably is substantially spherical.

Where the ball 64 is coupled by a retainer 64, such as retainer pin 108, to the coupling head 68 of the blade 31 of the lifter bar 46 at the coupling end 57 of the blade 31 of the bar 46, the ball coupling retainer receiving bore 112 of the lifter bar 46 can and preferably does extend through both guide ribs 90 and 92 of the coupling head 68 of the blade 31 of the lifter bar 46 at or adjacent the coupling end 57 of the blade 31 of the bar 46 in a direction generally transverse to the longitudinal or lengthwise direction of the bar 46, such as is shown in FIGS. 2-4, with the bore 112 preferably being generally centrally located in the middle of each rib 90, 92 of the bar 46. When the ball 64 is coupled to the head 68 of the blade 31 of the lifter bar 46 at the coupling end 57 thereof with the oppositely outwardly extending ribs 90 and 92 received in a corresponding one of the oppositely outwardly extending rib-receiving slots 96 and 98 formed in opposite sides of the channel 94 of the lifter bar blade coupling head receiving seat 80 formed in the ball 64 that defines the lifter bar coupling socket 49 of the ball 64, the ball 64 preferably is securely and positively coupled or attached to the lifter bar 46.

Where the ball 64 and bar 46 are coupled to one another, such as by or using a retainer 64, e.g., retainer pin 108, in a manner that permits some relative movement therebetween, such as by being configured with some play therebetween, the ball 64 is coupled with or attached to the coupling head 68 of the lifter bar 46 in a manner that permits some relative pivoting motion between the ball 64 and coupling head 68 of the bar 46 about a transverse pivot axis 156 generally transversely extending through the ball 64 in a direction that is (a) transverse or generally perpendicular to the bar 46 and the channel 124 or bearing race 126 of the guide shoe 66 of the receiver 56 in the base 58, (b) transverse or generally perpendicular to the longitudinal or lengthwise extent of the channel 124, bearing race 126, and base 58, and/or (c) transverse or generally perpendicular to the longitudinal or lengthwise extent of the lifter bar 46. Where the ball 64 is coupled to the lifter bar 46 by a retainer 64 that preferably is a retainer pin 108 in a manner that permits some relative movement therebetween, the pin 108 not only extends through at least part the ball 64 and the coupling head 68 of the blade 31 of the lifter bar 46 in a direction transverse or generally perpendicular to the longitudinal or lengthwise extent of the bar 46 in coupling the ball 64 to the bar 46, but the pin 108 (along with the coaxially aligned bores 110, 112 and 114 that receive the pin 108) can and preferably does define or function as the transverse pivot axis 156, such as depicted in FIGS. 8 and 9, about which the ball 46 can pivot at least slightly, preferably at least 1°, relative to the bar 46, its coupling end 57, and its coupling head 68, while the ball 64 is coupled to the bar 46, including during core lifter assembly, core lifter installation into a molding apparatus 42, during core lifter use, and during molding apparatus operation.

Where the ball 64 is coupled to the lifter bar 46 by a retainer 64 that preferably is a retainer pin 108 in a manner that permits some relative movement therebetween, the pin 108 extends through coaxial bores 110 and 114 in ball 64 and bore 112 in lifter bar 46 disposed between and coaxial with bores 110 and 114 in ball 64 while the outwardly extending ribs 90 and 92 of the coupling head 68 are respectively received in the rib-receiving slots 96 and 98 formed in the sides of the channel 94 of the coupling socket 49 in the ball 64 forming the hinge knuckle joint 70 between the ball 64 and head 68 of the blade 31 of the bar 46. The pin 108 (and coaxial bores 110, 112 and 114 that receive the pin 108) can and preferably does function as a pivot, i.e., the pin 108 is or defines the pivot, about which the ball 64 can pivot a limited amount relative to the head 68 of the bar 46 at or adjacent the coupling end 57 of the bar 46 in facilitating core lifter assembly, core lifter installation, core lifter use, core lifter operation and/or molding apparatus operation. In such a preferred embodiment, the pin 108 (and coaxial bores 110, 112 and/or 114 that receive the pin 108) can and preferably does define or extend along a transverse pivot axis 156 about which the ball 64 pivots or rotates relative to the head 68 of the bar 46 at or adjacent the coupling end 57 of the bar 46 in helping to provide tolerance compensation and/or alignment or misalignment adjustment during core lifter assembly, installation of core lifter 40 into a molding apparatus 42, and/or use of the core lifter 42 including during mold cycling during plastics injection molding operation of the molding apparatus 42. In at least one such embodiment, such as depicted in FIGS. 8 and 9, the pin 108 (and coaxial bores 110, 112 and/or 114 that receive the pin 108) can and preferably does define or extend along a transverse pivot axis 156 that also extends through the center 154 and/or transverse centerline 155 of the ball 64 in a direction transverse to the longitudinal or lengthwise direction of the bar 46 and which also is generally transverse to the channel 124 and bearing race 126 during normal use and operation of the core lifter 40 during normal use and operation of the molding apparatus 42. Where the pin 108 of such a core lifter embodiment defines the generally horizontally extending pivot axis 156 extending through the center 154 and/or along the transverse centerline 155 of the ball 64 transverse to the lifter bar 46 and base 58, the pin 108 defines the pivot about which the ball 64 can and preferably is able to pivot at least a limited amount relative to the head 68 of the blade 31 of the bar 46 during core lifter installation, core lifter use, and/or molding apparatus operation.

In one such preferred core lifter embodiment, the ball 64 is coupled to the lifter bar 46 by a retainer 64 that preferably is a retainer pin 108 in a manner that permits some relative movement therebetween, the ball 64 and coupling head 68 of the blade 31 of the bar 46 are configured to permit at least 1° of relative pivoting or relative pivotable movement between the ball 64 and head 68 of blade 31 of bar 46, e.g., permit the ball 64 to pivot or rotate 1° or ±0.5° about the head 68 of the lifter bar blade 31, but no more than 5°. In another such preferred embodiment, the ball 64 is coupled to the lifter bar 46 by a retainer 64 that preferably is a retainer pin 108 in a manner that permits some relative movement therebetween, the ball 64 and coupling head 68 of the blade 31 are configured to permit at least 0.5° of relative pivoting or relative pivotable movement between the ball 64 and head 68 of blade 31, e.g., permit the ball 64 to pivot or rotate at least 0.5° or at least ±0.25° about the transverse pivot axis 156 relative to the head 68 of the blade 31, but allows no more than 1°, e.g., no more than ±0.5°, relative pivoting or relative pivotable movement therebetween. In still another such preferred embodiment, the ball 64 is coupled to the lifter bar 46 by a retainer 64 that preferably is a retainer pin 108 in a manner that permits some relative movement therebetween, the ball 64 and coupling head 68 of the blade 31 are configured to permit at least 1° of relative pivoting or relative pivotable movement between the ball 64 and head 68 of blade 31, e.g., permit the ball 64 to pivot or rotate at least 1° or at least ±0.5° about the transverse pivot axis 156 relative to the head 68 of the blade 31, but allows no more than 2°, e.g., no more than ±1°, relative pivoting or pivotable movement therebetween. In yet another such preferred embodiment, the ball 64 is coupled to the lifter bar 46 by a retainer 64 that preferably is a retainer pin 108 in a manner that permits some relative movement therebetween, the ball 64 and coupling head 68 of the blade 31 are configured to permit at least 1° of relative pivoting or relative pivotable movement between the ball 64 and head 68 of lifter bar blade 31, e.g., permit the ball 64 to pivot or rotate at least 1° or at least ±0.5° about the transverse pivot axis 156 relative to the head 68 of the blade 31 of the bar 46, but allows no more than 3°, e.g., no more than ±1.5°, relative pivoting or relative pivotable movement therebetween. In a further such preferred embodiment, the ball 64 is coupled to the blade 31 of the lifter bar 46 by a retainer 64 that preferably is a retainer pin 108 in a manner that permits some relative movement therebetween, the ball 64 and coupling head 68 of the blade 31 of the bar 46 are configured to permit at least 1° of relative pivoting or relative pivotable movement between the ball 64 and head 68 of the blade 31 of the bar 46, e.g., permit the ball 64 to pivot or rotate at least 1° or at least ±0.5° about the transverse pivot axis 156 relative to the head 68 of the blade 31 of the bar 46, but allows no more than 5°, e.g., no more than ±2.5°, relative pivoting or relative pivotable movement therebetween.

To facilitate enabling at least some relative pivoting or rotation between the ball 64 and lifter bar blade coupling head 68, the head 68 and the ball 64 preferably are configured so that there is a space or gap between the lifter bar blade coupling head endwall 85 and coupler ball receiver channel endwall 95 as best depicted in FIG. 11. Where it is desired to increase the angular range that the ball 64 can rotate relative to the head 68 about axis 156, the spacing or distance between the lifter bar coupling head endwall 85 and lift bar blade coupling head receiving channel endwall 95 can be increased, or the head endwall 85 and channel endwall 95 can be substantially complementarily curved, e.g. have an arcuate-shape, relative to one another, if desired. In at least one preferred embodiment, the endwall 85 of the coupling head 68 formed at or adjacent the coupling end 57 of the blade 31 of the lifter bar 46 is curved and the endwall 95 of the channel 94 of the lifter bar blade head coupling socket 49 formed in the ball 64 also is curved, with the curved lifter bar coupling head endwall 85 and curved lift bar coupling head receiving channel endwall 95 being complementarily curved to facilitate relative rotation or pivoting between the lifter bar blade coupling head 68 and ball 64 pivotably coupled to the head 68.

Where configured to permit limited relative rotation therebetween, such a core lifter coupling ball 64 and lifter bar blade coupling head 68 are configured so their respective endwalls 85, 95 permit no greater than a 5 degree relative angular rotation therebetween, e.g., a 5 degree angular rotation range, about axis 156, preferably no greater than 2.5 degrees relative angular rotation therebetween, e.g., a 2.5 degree angular rotation range, about axis 156, and more preferably no greater than about a 1 degree relative angular rotation therebetween, e.g., a 1 degree angular rotation range, about axis 156. Where configured to permit such limited angular rotation between the ball 64 and lifter bar blade coupling head 68 about axis 156, such a core lifter bearing knuckle joint 70 configured to permit such relative angular or pivoting adjustment of the ball 64 and lifter bar blade coupling head 68 of such a core lifter 40 of the present invention advantageously helps facilitate self-alignment of the core lifter 40 during assembly of the ball 64 to the coupling head 68, installation of the core lifter 40 to the molding apparatus 62, as well as during core lifter use and molding apparatus operation.

Where it is desired to limit the amount of rotational play between the ball 64 and lifter bar blade coupling head 68, e.g. limit or prevent relative rotation therebetween, the ball 64 and head 68 can be configured so that the head endwall 85 and channel endwall 95 abut or stop against one another when the pin 108 is inserted attaching the ball 64 to the head 68. Where there is very little rotational play or even substantially no play, with the exception of side-to-side play therebetween discussed elsewhere herein, the lifter bar 46 and ball 68 preferably rotate, swivel, and move substantially in unison therewith during installation into molding apparatus 62, and/or during molding apparatus operation.

With reference to FIGS. 4-8, lifter bar blade coupling head 68 and core lifter ball 64 can be and preferably are configured with side-to-side spacing or a gap therebetween when coupled together that permits side-to-side relative movement therebetween when coupled together by permitting the ball 64 to move relative to head 68 a limited amount in a direction transverse to the longitudinal or lengthwise direction of the blade 31 of the lifter bar 46 advantageously helping facilitate automatic core lifter adjustment and/or core self-alignment, including during assembly, installation, and/or molding apparatus operation. Such a core lifter 40 constructed with a lifter bar coupling head 68 and ball 64 that couple together with a knuckle joint 70 configured to permit side-to-side relative movement between the ball 64 and head 68, preferably is constructed or configured with or to provide (a) a side-to-side spacing or gap 118 between the ribs 90, 92 of the lifter bar blade coupling head 68 and walls 97, 99 (FIG. 6) of the respective rib-receiving slots 96, 98 of the lifter bar blade coupling head-receiving channel 94 of the lifter bar blade coupling head socket 49 formed in the ball 64 and/or (b) a side-to-side spacing or gap 120 between the ribs 104, 106 that extend outwardly from the channel 94 formed in the ball 64 and the walls 87, 89 of respective rib-seating channels 82, 84 of head 68 as best depicted in FIG. 8 in order to enable the ball 64 to transversely float on the coupling head 68 of the lifter bar blade 31 when the ball 64 is coupled thereto by enabling side-to-side relative movement between the ball 64 and head 68 in a direction transverse to the longitudinal or lengthwise direction of the blade 31 or bar 46. When the ball 64 is received in the channel 124 and bearing race 126 formed in the base 58 thereby substantially constraining or preventing sideways, side-to-side or transverse movement of the ball 64 within the channel 124 and race 126 relative to the base 58, the construction of such a tolerance or misalignment compensating coupling joint 70 advantageously permits at least the head 68 of the lifter bar 46 and preferably also at least part of the elongate blade 31 of the bar 46 that extends outwardly from the head 68, to move relative to the ball 64 at least slightly in a side-to-side or sideways in direction that is generally transverse to the longitudinal core lifter bar blade centerline or core lifter bar central longitudinal axis 122. When the core lifter bar coupling and guide ball 64 is received in the guide shoe 66 of the coupler receiver 56 of the core lifter base 58, the play or tolerance(s) between the ball 46 and head 68 of the blade 31 from such a coupling joint 70 of tolerance and/or misalignment compensating construction produces such gaps 118 and/or 120 extending in a transverse direction between the ball 64 and lifter bar blade coupling head 68, such as depicted in FIG. 8, thereby advantageously providing a limited amount of side-to-side, sideways or transverse core lifter self-alignment, tolerance compensation, and misalignment adjustment by enabling the lifter bar blade 31 to transversely move relative to the ball 64 a limited amount relative to the central longitudinal lifter bar blade axis 122. During such transverse self-aligning, tolerance compensating and/or misalignment adjustment, the head 68 of the lifter bar blade 31 slidably rides along pin 108, which serves as a transverse self-aligning, tolerance compensating and/or misalignment adjustment guide that guides or constrains side-to-side or sideways movement of the head 68 relative to the ball 68 and core lifter base 58 in a direction generally transverse to the longitudinally extending lifter bar blade center axis 122.

FIGS. 2, 7 and 8 illustrate the core lifter base 58 and the guide shoe 66 of the lifter bar coupler receiver 56 of the base 58 in more detail that receives the bar-coupling and guide ball 64 of the ball-and-socket coupler 54 at the end of the blade 31 of the lifter bar 46 in an elongate recessed channel 124 of the guide shoe 66 of the receiver 56 formed in the body 61 of the base 58 that defines a generally U-shaped bearing race 126. With continued reference to FIGS. 2 and 7, the channel 124 or bearing race 126 has a rounded, preferably generally circular internal cross-section taken transverse to the longitudinal direction of the base 58 with the channel 124 or bearing race 126 having (a) an open mouth 128 at one end 67 of the base 58 through which the ball 64 is slidably inserted during assembly of the ball 64 and lifter bar 46 to the base 58, and (b) an elongate lifter bar guide slot 130 extending longitudinally along a top surface 63 of the body 61 of the base 58 that communicates with the channel 124 or bearing race 126 through which the lifter bar 46 extends and along which the blade 31 or bar 46 can be slidably guided when the ball 54 is received in the channel 124 or bearing race 126. As best shown in FIG. 7, bearing race 126 has (a) a concavely curved bottom or bottom surface that is at least partially spherical and preferably substantially spherical in contour, and a pair of opposed concavely curved sides or sidewalls that are each at least partially spherical and preferably substantially spherical in contour forming bearing race 126 complementary in shape or contour with that of the ball 64. If desired, the channel 124 or bearing race 126 can have an open mouth 128, 132 at both or opposite ends 67, 69 of the base 58 providing a ball-insertion entryway at either end of the channel 124 or bearing race 126 as depicted in FIG. 7.

As best shown in FIG. 7, the bearing race 126 and/or channel 124 preferably extends longitudinally or in a lengthwise direction relative to the base 58 substantially the length of the base 58 and the lifter bar or blade guide slot 130 preferably also extends longitudinally or in a lengthwise direction relative to the base 58 substantially the length of the base 58. In the preferred core lifter embodiment shown in the drawings, the channel 124 and/or bearing race 126 extends the entire length of the body 61 of the base 58, the lifter bar or blade guide slot 130 also extends the full length of the body 61 of the base 58, and the channel 124 and/or bearing race 126 has a lift bar coupling ball receiving mouth 128 and 132 at each end of the body 61 of the base 58. Such a channel 124, bearing race 126 and guide slot 130 construction advantageously enables the ball 64 and blade 31 of lifter bar 46 to translate in a longitudinal or lengthwise direction, e.g., fore-aft direction, along the base 58 during insertion of the ball 64 into the channel 124 or bearing race 126 during assembly of the lifter bar 46 to the base 58, during installation of an assembled core lifter 40 to the molding apparatus 42, as well as during use and operation of the assembled core lifter 40 during operation of the molding apparatus 42.

With continued reference to FIGS. 2, 7, and 8, the guide slot 130 is elongate, substantially straight, and extends between a pair of oppositely inwardly extending lifter bar guide arms 134, 136 each of which extend inwardly from a respective one of the sides 71, 73 of the base 58. As best shown in FIGS. 7-9, each one of the lifter bar blade guide arms 134, 136 has a respective elongate, generally straight, and substantially flat lifter bar blade guide bearing flat 138, 140 along which a respective side 87, 89 of a corresponding guide channel 82, 84 of the blade 31 of the lifter bar 46 can slidably ride during assembly, installation, self-alignment, core lifter use, and molding apparatus operation.

The core lifter bar blade guide arms 134, 136 extend toward one another but preferably are spaced apart from one another defining a lifter bar blade guide slot 130 therebetween that extends along respective upper portions of a lifter bar coupling ball receiving and guiding bearing race 126 having a generally circular transverse cross-section extending greater than 180 degrees, preferably greater than 285 degrees, and more preferably greater than about 300 degrees around the core lifter bar coupling ball 64 received therein, permitting the lifter bar coupling ball 64 to rotate in the bearing race 126 relative to the base 58 as well as translate or move along the bearing race 126 and the base 58 with the opposed lifter bar blade guide arms 134, 136 interfering with removal of the ball 64 outwardly through the guide slot 130 thereby preventing disengagement of the lifter bar 46 from the base 58. In the preferred core lifter embodiment shown in the drawings, the core lifter bar blade guide arms 134, 136 are spaced apart by the guide slot 130 and extend along respective upper portions of such a bearing race 126 that has a generally transverse circular cross-section that extends at least 235 degrees, at least 285 degrees, and at least 300 degrees around the ball 64 received in the bearing race 126 while permitting the ball 64 to rotate within the bearing race 126 while enabling the ball 64 the move along the bearing race 126. Preferably, the core lifter bar guide arms 134, 136 are spaced apart by the guide slot 130 extend alongside such a bearing race 126 having a generally transverse circular cross-section that extends at least 235 degrees, at least 285 degrees, and at least 300 degrees around the ball 64 received in the bearing race 126 and about a longitudinal centerline 158 of the race 126 that extends through the center point 154 of the ball 64 while permitting the ball 64 to rotate within the bearing race 126 while also substantially simultaneously enabling the ball 64 the move along the bearing race 126 with the arms 134, 136 interfering with the ball 64 being pulled out the guide slot 130.

As discussed in more detail below, longitudinal centerline 158 extends through the center point 154 of the core lifter bar coupling ball 64 also defining a longitudinal axis 158 of rotation of the ball 64 about the center point 154 and rotational axis 158 in a side-to-side direction transverse or generally perpendicular to the longitudinal or lengthwise direction of the base 58. As such, it should be readily apparent from FIGS. 1, 2, and 7-11, since the blade 31 is coupled to the ball 64 received in the bearing race 126 thereby coupling the lifter bar 46 to the base 58, the blade 31 and bar 46 pivots or otherwise moves side-to-side relative to the base 58 substantially in unison with side-to-side pivoting of the ball 64 about axis 156 within the bearing race 126 and translates in a fore-aft direction relative to the base 58 substantially in unison with fore-aft translation of the ball 64 along the bearing race 126. In addition, the ball 64 can pivot about axis 156 and translate substantially simultaneously within the bearing race 126 in a fore-aft longitudinal or lengthwise direction relative to the base 58 with the blade 31 and bar 46 also substantially simultaneously pivoting or moving side-to-side relative to the base 58 while substantially simultaneously translating in the fore-aft direction relative to the base 58 substantially simultaneous with the side-to-side pivoting and fore-aft movement of the ball 64 within or along the bearing race 126.

Figure 10:
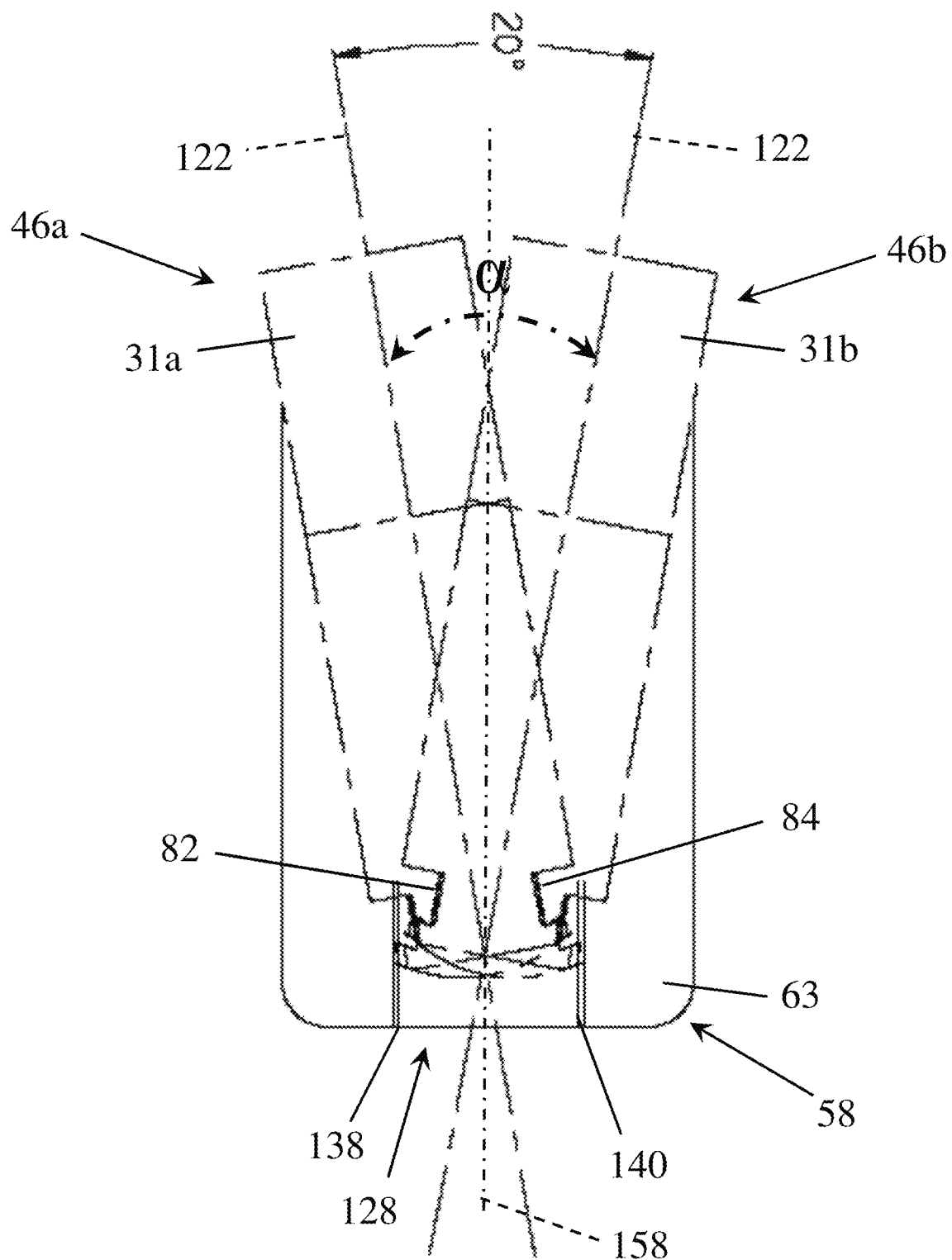
FIG. 10 is a top plan view of the core lifter assembly of FIG. 9 depicting side-to-side angular adjustment or self-alignment of angular range of up to ±10 degrees about the first axis extending along a longitudinal centerline of the bearing raceway that also extends through a center of the ball of the coupler assembly.

With reference to FIGS. 8-10, if desired, the space between the opposed lifter bar blade guide bearing flats 138 and 140 can be greater than the width of the blade 31 of the lifter bar 46 and/or wider than the space between opposed lifter bar blade sidewalls 86 and 88, but is no greater than three times lifter bar blade width, and preferably is no greater than two times lifter bar blade width, enabling the ball 64 to pivot in a side-to-side, sideways or transverse direction relative to the base 58 about the elongate longitudinally extending center axis 158 of the bearing race 126 an angular extent, α, of no greater than ±15° in either direction relative to the axis 158 before one of the lifter bar blade guide channel walls 87 and/or 89 and/or shoulders 81 and/or 83 abuts or stops against a respective adjacent one of the lifter bar blade guide bearing flats 138 and 140, such as in the manner depicted in FIG. 9. The space between the guide bearing flats 138 and 140 of the preferred core lifter embodiment shown in FIGS. 9 and 10 is greater than the width of the core blade or lifter bar 46 between the walls 87, 89 of the respective knuckle arm guide channels 82 and 84 and which can be and preferably is less than the width between the sidewalls 86 and 88 of the core blade or lifter bar 46 with one of the guide channel walls 87, 89 abutting or stopping against part of a respective adjacent one of the bearing flats 138 and/or 140 allowing an angular extent, α, of side-to-side, sideway or transverse pivoting or rotation of the blade 31 and ball 64 of the lifter bar 46 about longitudinal ball and bearing race center axis 158 of at least ±5° relative to the vertical central longitudinal base axis 135 and preferably no greater than about ±10° relative to the vertical central longitudinal base axis 135 as shown in FIG. 9. This arrangement permits side-to-side, sideways or transverse pivoting of the blade 31 of the lifter bar 46 about the longitudinal ball and bearing race center axis 158 forming an acute angular extent, α, between the vertical central longitudinal base axis 135 and the central longitudinal lifter bar blade axis 122 that can range between 0° and ±25° but which preferably can range or extend from axis 135 at least ±5° and preferably at least about ±10°, e.g., ±10°±2.5°.

In the preferred core lifter embodiment shown in FIGS. 9 and 10, the base 58, core lifter bar blade 31 and core lifter bar coupling ball 64 are configured to produce a core lifter 40 where the blade 31 pivots or rotates about side-to-side lifter bar pivot axis 158 an angular extent, α, of ±10° or a total angular extent of 20°. The lifter bar 46 is shown in FIG. 10 with the lifter bar 46a located in a first maximum outermost angular position when the blade 31a of the bar 46a is pivoted or rotated about axis 158 in one sideways or transverse direction and with the lifter bar 46b located in a second maximum outermost angular position when the blade 31b of the bar 46b is pivoted or rotated about axis 158 in an opposite sideways or transverse direction depicting a maximum angular extent, α, of about 20° about which the blade 31 of the bar 46 can pivot or rotate about axis 158. As previously discussed, side-to-side pivoting or rotation of the ball 64, blade 31 and bar 46 about axis 158 is limited by the lifter bar blade guide bearing flats 138 and 140, which respectively serve as hard stops against which a respective portion of the blade 31 abuts or contacts when reaching the maximum angular travel position in either direction.

With reference to FIGS. 7-11, the lifter bar blade guide bearing flats 138 and 140 also serve as a fore-aft lifter bar blade movement guide that can help guide the blade 31 and preferably the entire lifter bar 46 during fore-aft movement of the blade 31 and bar 46 along the guide slot 130 during fore-aft translation of the ball 64 along the channel 124 or bearing race 126 within the base 58 in a longitudinal or lengthwise direction relative to the base 58, including during lifter bar assembly to the base 58, during lifter bar self-adjustment relative to the molding apparatus 42 during core lifter installation, during core lifter use, and/or during mold cycling during molding apparatus operation. As depicted by FIGS. 8 and 9, the lifter bar blade guide bearing flats 138 and 140 also serve as lifter bar blade pivot abutments 145 and 147 against which a respective side or wall of the blade 31 of the lifter bar 46 abuts or stops when the ball 64 is pivoted in a side-to-side direction within the channel 124 or bearing race 126 toward one of the flats 138 or 140 about its longitudinal rotational axis 156.

As is best shown in FIG. 9, each one of the flats 138 and 140 are outwardly canted away from one another forming or defining an acute included angle therebetween with each one of the flats 138 and 140 thereby being outwardly beveled so as to prevent binding of the blade 31 of lifter bar 46 sliding along a respective one of the flats 138 or 140 by reducing static and dynamic friction therebetween. When the blade 31 of the lifter bar 46 is pivoted in a fore-aft direction about fore-aft pivot axis 156 (FIGS. 9 and 11), at least one of the stops 91 and/or 93 of corresponding shoulders 81 and 83 defined by guide channels 82 and 84 of the lifter bar blade coupling head 68 abuts or stops against at least a respective one of the stops 145 and/or 147 provided or defined by the lifter bar blade guide bearing flats 138 and/or 140 preventing the blade 31 and ball 64 from the lifter bar 46 from further pivoting or rotation. Such outwardly canted or outwardly beveled flats 138 and 140 also help provide or define a more positive fore-aft pivoting directional stop 145 and 147 when the stops 91 and 93 defined by lifter bar blade guide channel shoulders 81 and 83 abut or bear against respective flats 138 and 140 by providing a greater surface area of contact between the respective pairs of mating stops 91, 145 and 93, 147.

When the blade 31 of the lifter bar 46 is pivoted about the transverse fore-aft pivot axis 156, the blade 31 preferably rotates or pivots about the fore-aft lifter bar blade pivot axis 156 that extends generally horizontally and transversely through the ball 64 and the base 58 in a fore-aft direction such as depicted in FIG. 11. With continued reference to FIG. 11, the blade 31 of the lifter bar 46 of a core lifter 40 of the present invention can rotate or pivot about the fore-aft pivot axis 156 such that the angle, β, between the central longitudinal base axis 135 and the central longitudinal lifter bar blade axis 122 is no greater than 45°, preferably ±22.5° in the fore-aft direction forwardly or rearwardly of the central longitudinal base axis 135°. Whether pivoted in the fore-aft direction forwardly or rearwardly about the fore-aft pivot axis 156, at least one of the recessed guide-channel forming shoulders 81 and 83 defined by guide channels 82 and 84 formed in the sides 86 and 88 of the blade 31 of the lifter bar 46 function as or define fore-aft pivot or rotation stops 91 and 93 that limit the angular extent, β, of pivoting or rotation of the blade 31 and ball 64 about the fore-aft pivot axis 156 in the manner depicted in FIG. 11.

In the preferred embodiment shown in FIG. 11, the lifter bar 46, including its ball 64 and blade 31, can pivot or rotate forwardly in the fore-aft direction relative to the central longitudinal base axis 135° such that the central longitudinal lifter bar blade axis 122° forms an acute included angle, β, therebetween of at least 5°, preferably at least 10°, and which can be as large as 20° as illustrated in FIG. 11. Although not shown in FIG. 11, the lifter bar 46, including its ball 64 and blade 31, can pivot or rotate rearwardly in the fore-aft direction relative to the central longitudinal base axis 135° such that the central longitudinal lifter bar blade axis 122° forms an acute included angle, β, therebetween of at least 5°, preferably at least 10°, and preferably which is at least about 20°. In one preferred core lifter embodiment, β, has a range of at least ±10° in the fore-aft direction depicted by arrow 105 in FIG. 11. In another preferred embodiment, β, has a range of at least ±15° in the fore-aft direction depicted by arrow 105 in FIG. 11. In still another preferred embodiment, β, has a range of at least about ±20°, e.g., ±20°±5°.

The substantially spherical outer profile of the ball 64 enables the lifter bar 46 of the core lifter 40 of the present invention to pivot about the fore-aft axis 156 extending longitudinally relative to the base 58 through the center point 154 pivot or pin 108 at least 10 degrees, preferably at least 15 degrees and more preferably at least 20 degrees in the release direction, e.g., in or along the direction of the bearing race 126. Where lacking a pin 108, the fore-aft axis extends through a center of the ball 64 generally perpendicular to the lengthwise extent of the lifter bar 46 and along a lengthwise fore-aft direction along the guide shoe 66 or bearing race 126.

In a preferred core lifter embodiment, the substantially spherical outer profile of the ball 64 enables the lifter bar 46 of the core lifter 40 to pivot about the fore-aft pivot axis 156 extending through the pivot or pin 108 at least ±10 degrees, preferably at least ±15 degrees and more preferably at least ±20 degrees in the release direction, e.g., in or along the direction of the guide shoe 66 or bearing race 126. The substantially spherical outer profile of the ball 64 also enables the lifter bar or core blade 31 of the core lifter 40 to tilt from side-to-side about a transverse axis extending longitudinally through the bearing race 126 and through the center of the ball 64 at least 5 degrees, preferably at least 10 degrees and more preferably at least 15 degrees generally transverse to the release direction, e.g., generally transverse to the lengthwise direction of the bearing race 126. In a preferred embodiment, the substantially spherical outer profile of the ball 64 enables the lifter bar or core blade 64 of the core lifter 40 to tilt from side-to-side about an axis extending longitudinally through the bearing race 126 and through the center of the ball 64 at least ±5 degrees, preferably at least ±10 degrees and more preferably at least ±15 degrees generally transverse to the release direction, e.g., generally transverse to the lengthwise direction of the bearing race 126. A lifter bar or core blade 46 of such a core lifter 40 of the present invention is better able to swivel, pivot, rotate and move side-to-side in adjusting at it slides in and along a guide slot formed in the mold that is an angled primary release direction slot of compound angle construction without binding.

The present invention advantageously is therefore directed to a core lifter 40 or 40' that is of fully articulating construction by being able to both tilt and swivel relative to the base 58 and which preferably also is of substantially self-aligning construction by further being able to slidably move in a fore-aft direction along the longitudinal or lengthwise direction of the base 58 while also being able to move side-to-side independently of tilting or swiveling. Such a core lifter 40 or 40' of the present invention is a fully articulating core lifter 40 or 40' by its core blade or lifter bar 46 or 46', and the core 48 or 48' carried thereby, being able to both tilt and swivel and preferably which also is of substantially self-aligning construction by the core blade or lifter bar 46 further being able to slidably move in a fore-aft direction while also being able to move side-to-side independently of tilting or swiveling during installation of such a core lifter 40 or 40' into a molding apparatus 42 and during use of the core lifter 40 or 40' during molding apparatus operation. The present invention therefore also is directed to a core lifter 40 or 40' that is of fully articulating construction by the core 48 or 48' of the lifter 40 or 40' and the core blade or lifter bar 46 or 46' carrying the core 48 or 48' being able to both tilt and swivel and preferably which also is of substantially self-aligning construction by the core 48 or 48' and core blade or lifter bar 46 or 46' further being able to slidably move in a fore-aft direction while also being able to move side-to-side independently of tilting or swiveling during core lifter installation and molding apparatus operation.

The present invention advantageously is therefore directed to an articulating, preferably fully articulating self-aligning core lifter 40 for a formable material forming apparatus that preferably is a formable material molding apparatus, e.g. plastic molding apparatus, which more preferably is a plastics injection molding apparatus, e.g., plastic injection mold. Such a lifter of the present invention is able to self-align relative to a slot of the molding apparatus and/or pocket in the undercut of the molding apparatus by being angularly adjustable or self-adjusting up to 20 degrees in the release direction as depicted in FIG. 11 and also being angularly adjustable or self-adjusting in any other 360-degree direction at least 5 degrees, e.g., ±5 degrees, and preferably at least 10 degrees, e.g., ±10 degrees without binding and without requiring a guided ejector system (preferably without using a guided ejector system).

Such a lifter of the present invention being able to self-align relative to a slot formed in a mold of the apparatus in which the core blade 46 is slidably received and/or pocket in the undercut of a mold of the apparatus by being angularly adjustable or self-adjusting up to 20 degrees in the release direction as depicted in FIG. 11 and being angularly adjustable or self-adjusting in any other direction between 10-25 degrees without binding and without requiring a guided ejector system (preferably without using a guided ejector system). In a preferred embodiment, such a lifter of the present invention self-aligns to or in the mold slot or pocket of the undercut by being angularly adjustable or self-adjusting up to ±20 degrees in the release direction and being angularly adjustable or self-adjusting in any other direction between ±10-25 degrees without binding and without requiring a guided ejector system (preferably without using a guided ejector system).

A core lifter 40 of the present invention also is scalable in core lifter, e.g., lifter bar or core blade, sizes or lengths of between 1 and 50 millimeters. Such a core lifter 40 can have a length or size less than 5 millimeters, preferably less than 2.5 millimeters, and more preferably less than 2 millimeters. Such a core lifter 40 is upwardly scalable to sizes or lengths greater than 40 millimeters, preferably greater than 50 millimeters, and more preferably greater than 60 millimeters depending on mold size and other factors.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention as defined hereby and herein.

It is claimed:

1. A core lifter for a molding apparatus, the core lifter comprising:
   (a) a core lifter bar comprised of an elongate core lifter blade, a core lifter bar coupler carried by the core lifter blade, and a joint configured for side-to-side movement of one of the core lifter blade and the core lifter bar coupler relative to the other one of the core lifter blade and the core lifter bar coupler; and
   (b) an elongate core lifter base carried by a portion of the molding apparatus, the core lifter bar base comprised of a core lifter bar coupling receiver formed therein that is configured for receiving the core lifter bar coupler, the core lifter bar coupler received in the core lifter bar coupling receiver, and the core lifter bar blade extending outwardly from the base; and
   wherein the core lifter blade pivots longitudinally, moves longitudinally, and moves side-to-side relative to the core lifter base.

2. The core lifter of claim 1, further comprising a core comprised of a three-dimensionally contoured molding face, the core removably attached to the core lifter blade via a second joint disposed at an end of the core lifter blade.

3. The core lifter of claim 1, wherein the core lifter base coupling receiver comprises an elongate core lifter bar coupler receiving channel formed in the core lifter base that extends lengthwise relative to the core lifter base, and a pair of elongate, opposed, generally parallel, and inclined lifter blade guide flats that define an elongate lifter bar guide slot therebetween, the lifter bar guide slot disposed in communication with the core lifter bar coupler receiving channel, the lifter bar guide slot extending longitudinally relative to the core lifter base, and wherein the lifter blade guide flats slidably guide the lifter blade along the lifter bar guide slot as the core lifter bar coupler moves longitudinally along the core lifter bar coupler receiving channel during longitudinal movement of the core lifter blade relative to the core lifter base.

4. The core lifter of claim 3, wherein the lifter blade guide flats are oppositely inclined relative to one another defining an acute included angle therebetween.

5. The core lifter of claim 1, wherein the core lifter base has an elongate channel of circular-cross section formed therein in communication with an elongate lifter blade guide slot; and wherein the core lifter bar coupler comprises a spherical core lifter bar coupling ball received in the channel, core lifter bar coupling ball floating transversely relative to the lifter blade enabling side-to-side translation of the core lifter blade relative to the core lifter base.

6. The core lifter of claim 5, wherein the core lifter bar coupling ball comprises a carbide ball bearing.

7. The core lifter of claim 1 wherein the core lifter base has an elongate and substantially straight core lifter bar coupler receiving channel in communication with an elongate and substantially straight core lifter bar blade guide slot overlying the core lifter bar coupler receiving channel, and wherein the core lifter blade pivots in a fore-aft direction relative to the core lifter base in a direction generally parallel to the core lifter bar coupler receiving channel, swivels relative to the core lifter base about a longitudinal central axis of the core lifter blade, rotates relative to the core lifter base in a side-to-side direction generally transversely to the core lifter bar coupler receiving channel, translates longitudinally relative to the core lifter base by moving along the core lifter bar coupler receiving channel with part of the core lifter blade extending upwardly through the core lifter blade guide slot, and translates transversely relative to the core lifter base by moving in a sideways direction relative to the core lifter base.

8. The core lifter of claim 1, wherein the core lifter bar coupler comprises a core lifter bar coupling ball attached to the core lifter blade by the joint, wherein the joint is configured so the core lifter bar coupling ball transversely floats relative to the core lifter blade thereby enabling movement of one of the core lifter blade and core lifter bar coupling ball generally transversely relative to the other one of the core lifter blade and core lifter bar coupling ball and generally transversely relative to the direction of longitudinal movement of the core lifter blade relative to the core lifter base.

9. The core lifter of claim 1, wherein the core lifter base is removably fastened to the portion of the molding apparatus by a plurality of fasteners.

10. The core lifter of claim 1, wherein the core lifter bar coupler comprises a core lifter bar coupling ball carried by the core lifter bar blade, wherein the base has a core lifter bar coupling receiver formed therein that comprises an elongate substantially straight channel that receives the core lifter bar coupling ball therein, and wherein the core lifter blade is elongate and substantially straight.

11. The core lifter of claim 10, wherein the core lifter bar coupling ball is removably attached to one end of the core lifter bar blade.

12. The core lifter of claim 1, wherein the core lifter bar receiver formed in the base comprises an elongate lifter bar guide slot formed in the core lifter base that overlies and communicates with an elongate core lifter bar coupler receiving channel formed in the core lifter base having a generally circular cross-section, wherein the core lifter bar coupler is operatively connected to the core lifter blade by the joint, and wherein the core lifter bar coupler has a generally spherical core lifter bar coupling ball received in the core lifter bar coupler receiving channel.

13. The core lifter of claim 12, wherein the core lifter bar coupling ball comprises a ball bearing composed of carbide.

14. The core lifter of claim 12, wherein the core lifter blade is substantially straight, and the elongate core lifter bar coupler receiving channel is an elongate substantially straight bearing race formed in the core lifter base in which the ball bearing slidably moves during movement of the core lifter blade longitudinally relative to the core lifter base, and wherein the joint is configured for side-to-side movement of the core lifter blade relative to the core lifter bar coupler in a direction generally transverse to the longitudinal movement of the core lifter blade relative to the core lifter base thereby enabling side-to-side movement of the core lifter blade relative to the core lifter base in the direction transverse to the longitudinal movement of the core lifter blade relative to the core lifter base t.

15. The core lifter of claim 1, wherein the core lifter bar is movably attached to the core lifter base enabling sideways rotation of the core lifter blade relative to a transverse direction of the core lifter base along about a pivot axis extending generally parallel to a longitudinal centerline of the core lifter base at least ±10 degrees about the pivot axis.

16. The core lifter of claim 1, wherein the core lifter bar is movably attached to the core lifter base enabling fore-aft pivoting of the core lifter blade relative to a lengthwise direction of the core lifter base along about a pivot axis extending transversely to a longitudinal centerline of the core lifter base at least ±10 degrees about the pivot axis.

17. The core lifter of claim 1, wherein the core lifter bar is movably attached to the core lifter base enabling swiveling of the core lifter blade relative to the core lifter base along about a central longitudinal axis of the core lifter blade.

18. The core lifter of claim 1, wherein the core lifter bar is movably attached to the core lifter base enabling tilting of the core lifter blade relative to the core lifter base along about a tilt axis of the core lifter base.

19. A core lifter for a molding apparatus, the core lifter comprising:
(a) a core lifter bar comprised of an elongate substantially straight core lifter blade, a generally spherical core lifter bar coupling ball, and a joint configured for side-to-side translation of one of the core lifter blade and core lifter bar coupling ball relative to the other one of the core lifter blade and core lifter bar coupling ball;
(b) an elongate core lifter base carried by a portion of the molding apparatus, an elongate substantially straight channel of circular cross-section formed in the core lifter base for receiving the core lifter bar coupling ball, and an elongate substantially straight core lifter blade guide slot overlying and in communication with the core lifter bar coupling ball receiving channel; and
wherein the core lifter blade (i) pivots relative to the core lifter base about the core lifter bar coupling ball received in the core lifter bar coupling ball receiving channel in a direction generally parallel to the core lifter bar coupling ball receiving channel, (ii) rotates generally transversely relative to the core lifter base, (iii) swivels relative to the core lifter base about a longitudinal axis of the core lifter blade, (iv) translates side-to-side relative to the core lifter base, and (v) translates longitudinally relative to the core lifter base by the core lifter bar coupling ball riding along the core lifter bar coupling ball receiving channel.

20. The core lifter of claim 19, wherein the core lifter blade guide slot is defined by a pair of elongate, substantially straight, and generally parallel core lifter blade guide flats inclined relative to one another defining an acute included angle therebetween, and wherein the angle of generally transverse rotation of core lifter blade relative to the core lifter base is limited by the core lifter blade stopping or abutting against one of the core lifter blade guide flats.

21. The core lifter of claim 19, wherein the joint of the core lifter bar configures the core lifter coupling ball to float relative to the core lifter blade for relative sideways translational movement therebetween.

22. The core lifter of claim 19, wherein the core lifter blade pivots ±20° relative to an axis extending through a center of the core lifter bar coupling ball generally parallel to a lengthwise extent of the core lifter bar coupling ball receiving channel.

23. The core lifter of claim 19, wherein the core lifter blade rotates ±10° relative to an axis extending through a center of the core lifter bar coupling ball generally transverse to a lengthwise extent of the core lifter bar coupling ball receiving channel.

24. The core lifter of claim 19, wherein the core lifter bar coupling ball comprises a carbide ball bearing and the core lifter bar coupling ball receiving channel comprises a bearing raceway.

25. A core lifter for a molding apparatus, the core lifter comprising:
(a) a core lifter bar comprised of an elongate substantially straight core lifter blade, and a core lifter bar coupling ball carried by the core lifter blade;
(b) an elongate core lifter base carried by a portion of the molding apparatus, an elongate substantially straight channel of circular cross-section formed in the core lifter base for receiving the core lifter bar coupling ball, and an elongate substantially straight core lifter blade guide slot overlying and in communication with the core lifter bar receiving ball receiving channel; and
wherein the core lifter blade, core lifter bar coupling ball, and core lifter base are configured so the core lifter blade (i) pivots along the core lifter blade guide slot about the core lifter bar coupling ball received in the core lifter bar coupling ball receiving channel in a direction generally parallel to the core lifter bar coupling ball receiving channel and the core lifter blade guide slot, (ii) rotates generally transversely relative to the core lifter bar coupling ball receiving channel and the core lifter blade guide slot, (iii) swivels about a longitudinal axis of the core lifter blade, (iv) translates side-to-side relative to the core lifter base, and (v) translates longitudinally relative to the core lifter base.

\* \* \* \* \*